United States Patent
Haruta et al.

(10) Patent No.: US 11,505,667 B2
(45) Date of Patent: *Nov. 22, 2022

(54) LAMINATED FILM ROLL AND METHOD OF PRODUCING THE SAME

(71) Applicant: Nitto Denko Corporation, Ibaraki (JP)

(72) Inventors: Hiromoto Haruta, Ibaraki (JP); Hiroyuki Takemoto, Ibaraki (JP); Daisuke Hattori, Ibaraki (JP); Kozo Nakamura, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/539,928

(22) PCT Filed: Dec. 25, 2015

(86) PCT No.: PCT/JP2015/086364
§ 371 (c)(1),
(2) Date: Jun. 26, 2017

(87) PCT Pub. No.: WO2016/104764
PCT Pub. Date: Jun. 30, 2016

(65) Prior Publication Data
US 2017/0341336 A1    Nov. 30, 2017

(30) Foreign Application Priority Data

Dec. 26, 2014 (JP) .................. 2014-266784
Jul. 31, 2015 (JP) .................. 2015-152968
Sep. 7, 2015 (JP) .................. JP2015-176206

(51) Int. Cl.
*C08J 7/043*     (2020.01)
*B32B 27/06*     (2006.01)
(Continued)

(52) U.S. Cl.
CPC .................. *C08J 7/043* (2020.01); *B32B 5/18* (2013.01); *B32B 27/06* (2013.01); *B32B 37/14* (2013.01);
(Continued)

(58) Field of Classification Search
CPC .............. B32B 5/18; B32B 7/02; B32B 27/06
See application file for complete search history.

(56) References Cited

U.S. PATENT DOCUMENTS 2,870,109 A    1/1959  Nickerson
4,408,009 A    10/1983 Mallon
(Continued)

FOREIGN PATENT DOCUMENTS

CN    1032503 A    4/1989
CN    1221629 A    7/1999
(Continued)

OTHER PUBLICATIONS

Extended (Supplementary) European Search Report dated Feb. 14, 2019, issued in EP application No. 16832969.6 (counterpart to U.S. Appl. No. 15/749,250)(6 pages).
(Continued)

*Primary Examiner* — Hai Vo
(74) *Attorney, Agent, or Firm* — WHDA, LLP

(57) ABSTRACT

The present invention provides a new member having a low refractive index as a substitute for an air layer, for example. The laminated film roll of the present invention includes a long laminated film roll including: an ultra-low refractive index layer having a refractive index of 1.20 or less; and a resin film, wherein the ultra-low refractive index layer is stacked on the resin film. The method of forming the long laminated film roll of the present invention includes steps of:
(Continued)

preparing a liquid containing microporous particles; coating a resin film with the liquid; and drying the liquid applied on the resin film, for example.

8 Claims, 7 Drawing Sheets

(51) Int. Cl.
| | |
|---|---|
| *C08J 7/04* | (2020.01) |
| *C08J 7/046* | (2020.01) |
| *B32B 5/18* | (2006.01) |
| *B32B 37/14* | (2006.01) |
| *G02B 1/10* | (2015.01) |

(52) U.S. Cl.
CPC ............. *C08J 7/046* (2020.01); *C08J 7/0427* (2020.01); *G02B 1/10* (2013.01); *B32B 2551/00* (2013.01); *C08J 2483/04* (2013.01)

(56) References Cited

U.S. PATENT DOCUMENTS

| | | | |
|---|---|---|---|
| 5,124,188 A | 6/1992 | Roe et al. | |
| 5,676,938 A | 10/1997 | Kimura et al. | |
| 5,844,060 A | 12/1998 | Furuya et al. | |
| 5,948,314 A | 9/1999 | Geiss et al. | |
| 5,948,482 A | 9/1999 | Brinker et al. | |
| 6,251,523 B1 | 6/2001 | Takahashi et al. | |
| 6,265,516 B1 | 7/2001 | Okawa et al. | |
| 6,300,385 B1 | 10/2001 | Hashida et al. | |
| 7,960,029 B2 | 6/2011 | Kai et al. | |
| 8,124,224 B2 | 2/2012 | Kato et al. | |
| 8,488,082 B2 | 7/2013 | Nishiguchi et al. | |
| 10,472,483 B2 | 11/2019 | Haruta et al. | |
| 2001/0003358 A1 | 6/2001 | Terase et al. | |
| 2003/0023021 A1 | 1/2003 | Sakuma | |
| 2003/0134124 A1 | 7/2003 | Ochiai | |
| 2004/0114248 A1 | 6/2004 | Hokazono et al. | |
| 2004/0132846 A1 | 7/2004 | Leventis et al. | |
| 2004/0216641 A1 | 11/2004 | Hamada et al. | |
| 2004/0253427 A1 | 12/2004 | Yokogawa et al. | |
| 2005/0038137 A1 | 2/2005 | Yoshihara et al. | |
| 2005/0162743 A1 | 7/2005 | Yano et al. | |
| 2005/0165197 A1 | 7/2005 | Ogihara et al. | |
| 2005/0195486 A1 | 9/2005 | Sasaki et al. | |
| 2006/0093786 A1 | 5/2006 | Ohashi et al. | |
| 2006/0164740 A1 | 7/2006 | Sone et al. | |
| 2006/0239886 A1 | 10/2006 | Nakayama et al. | |
| 2006/0269724 A1 | 11/2006 | Ohashi et al. | |
| 2006/0269733 A1 | 11/2006 | Mizuno et al. | |
| 2006/0281828 A1 | 12/2006 | Nakayama et al. | |
| 2007/0196667 A1 | 8/2007 | Asai | |
| 2007/0206283 A1 | 9/2007 | Ohtani et al. | |
| 2007/0248828 A1 | 10/2007 | Yoneyama et al. | |
| 2008/0075895 A1 | 3/2008 | Yamaki et al. | |
| 2008/0171188 A1 | 7/2008 | Van Baak et al. | |
| 2008/0290472 A1 | 11/2008 | Yagihashi et al. | |
| 2008/0311398 A1 | 12/2008 | Bauer et al. | |
| 2008/0316602 A1* | 12/2008 | Kameshima ............. G02B 1/11 359/599 |
| 2009/0202802 A1 | 8/2009 | Seong et al. | |
| 2009/0244709 A1 | 10/2009 | Suzuki et al. | |
| 2010/0102251 A1* | 4/2010 | Ferrini ..................... G02B 5/02 250/484.4 |
| 2010/0160577 A1 | 6/2010 | Hirano | |
| 2010/0246014 A1 | 9/2010 | Asahi et al. | |
| 2010/0256321 A1 | 10/2010 | Kim et al. | |
| 2011/0033398 A1 | 2/2011 | Cauvin et al. | |
| 2011/0195239 A1* | 8/2011 | Takane ..................... C09D 7/61 428/206 |
| 2011/0224308 A1 | 9/2011 | Saito et al. | |
| 2012/0038990 A1 | 2/2012 | Hao et al. | |
| 2013/0202867 A1 | 8/2013 | Coggio et al. | |
| 2013/0265477 A1 | 10/2013 | Furusato et al. | |
| 2013/0337161 A1 | 12/2013 | Akimoto et al. | |
| 2014/0009835 A1 | 1/2014 | Shibuya et al. | |
| 2014/0371317 A1 | 12/2014 | Aliyar et al. | |
| 2015/0037535 A1 | 2/2015 | Akimoto et al. | |
| 2015/0037605 A1 | 2/2015 | Oser et al. | |
| 2015/0166353 A1 | 6/2015 | Kobayashi et al. | |
| 2016/0025899 A1 | 1/2016 | Ishizeki et al. | |
| 2016/0131819 A1 | 5/2016 | Musashi et al. | |
| 2016/0170094 A1 | 6/2016 | Nakayama et al. | |
| 2016/0194451 A1 | 7/2016 | Yoshida et al. | |
| 2016/0304722 A1 | 10/2016 | Kobori | |
| 2017/0183542 A1 | 6/2017 | Kato et al. | |
| 2017/0341336 A1 | 11/2017 | Haruta et al. | |
| 2017/0342232 A1 | 11/2017 | Haruta et al. | |
| 2018/0002508 A1 | 1/2018 | Hattori et al. | |
| 2018/0215124 A1* | 8/2018 | Hattori ..................... B32B 7/14 |
| 2018/0223061 A1* | 8/2018 | Hattori ..................... C08J 7/046 |
| 2018/0224580 A1* | 8/2018 | Hattori ..................... G06F 3/00 |

FOREIGN PATENT DOCUMENTS

| | | |
|---|---|---|
| CN | 1256381 A | 6/2000 |
| CN | 1275589 A | 12/2000 |
| CN | 1544324 A | 11/2004 |
| CN | 1646947 A | 7/2005 |
| CN | 1809764 A | 7/2006 |
| CN | 1842727 A | 10/2006 |
| CN | 101007911 A | 8/2007 |
| CN | 101128752 A | 2/2008 |
| CN | 101792529 A | 8/2010 |
| CN | 102186668 A | 9/2011 |
| CN | 102460244 A | 5/2012 |
| CN | 102712140 A | 10/2012 |
| CN | 102736135 A | 10/2012 |
| CN | 103168257 A | 6/2013 |
| CN | 103185905 A | 7/2013 |
| CN | 103213996 A | 7/2013 |
| CN | 103660513 A | 3/2014 |
| CN | 103738971 A | 4/2014 |
| EP | 1031612 A2 | 2/1999 |
| EP | 3 235 638 A1 | 10/2017 |
| EP | 3239221 A1 | 11/2017 |
| EP | 3239257 A1 | 11/2017 |
| EP | 3246355 A1 | 11/2017 |
| JP | 61-250032 A | 11/1986 |
| JP | 5-506681 A | 9/1993 |
| JP | H07-48527 A | 2/1995 |
| JP | H07-133105 A | 5/1995 |
| JP | 9-24575 A | 1/1997 |
| JP | H10-508049 A | 8/1998 |
| JP | H11-292568 A | 10/1999 |
| JP | 2000-119433 A | 4/2000 |
| JP | 2000-256040 A | 9/2000 |
| JP | 2000-264620 A | 9/2000 |
| JP | 2000-284102 A | 10/2000 |
| JP | 2001-163613 A | 6/2001 |
| JP | 2002-311204 A | 10/2002 |
| JP | 2003-216061 A | 7/2003 |
| JP | 2004-10424 A | 1/2004 |
| JP | 2004-300172 A | 10/2004 |
| JP | 2004-323752 A | 11/2004 |
| JP | 2004-354699 A | 12/2004 |
| JP | 2005-148623 A | 6/2005 |
| JP | 2005-154195 A | 6/2005 |
| JP | 2005-350519 A | 12/2005 |
| JP | 2006-11175 A | 1/2006 |
| JP | 2006-96019 A | 4/2006 |
| JP | 2006-96967 A | 4/2006 |
| JP | 2006-221144 A | 8/2006 |
| JP | 2006-255496 A | 9/2006 |
| JP | 2006-297329 A | 11/2006 |
| JP | 2007-014946 A | 1/2007 |
| JP | 2008-40171 A | 2/2008 |
| JP | 2008-205008 A | 9/2008 |
| JP | 2008-214569 A | 9/2008 |
| JP | 2008-291074 A | 12/2008 |
| JP | 2009-503226 A | 1/2009 |
| JP | 2009-258711 A | 11/2009 |
| JP | 2010-256880 A | 11/2010 |

(56) References Cited

FOREIGN PATENT DOCUMENTS

| | | |
|---|---|---|
| JP | 2012-91943 A | 5/2012 |
| JP | 2012-189802 A | 10/2012 |
| JP | 2012-524299 A | 10/2012 |
| JP | 2012-228878 A | 11/2012 |
| JP | 2013-7831 A | 1/2013 |
| JP | 2013-60309 A | 4/2013 |
| JP | 2013-083722 A | 5/2013 |
| JP | 2014-46518 A | 3/2014 |
| JP | 2014-122309 A | 7/2014 |
| JP | 2015-028540 A | 2/2015 |
| JP | 2015-064607 A | 4/2015 |
| JP | 2016-104551 A | 6/2016 |
| KR | 10-2003-0040065 A | 5/2003 |
| KR | 10-2004-0044532 A | 5/2004 |
| KR | 10-2007-0011303 A | 1/2007 |
| KR | 10-2007-0022059 A | 2/2007 |
| KR | 10-2009-0006784 A | 1/2009 |
| TW | 213860 B | 10/1993 |
| TW | 200300157 A | 5/2003 |
| TW | 200844194 A | 11/2008 |
| TW | 201447389 A | 12/2014 |
| TW | 201447402 A | 12/2014 |
| WO | 2010/120845 A2 | 10/2010 |
| WO | 2010/120971 A1 | 10/2010 |
| WO | 2011/088161 A1 | 7/2011 |
| WO | 2012/115057 A1 | 8/2012 |
| WO | 2012/124693 A1 | 9/2012 |
| WO | 2014/034588 A1 | 3/2014 |
| WO | 2014/175124 A1 | 10/2014 |
| WO | 2015/041257 A1 | 3/2015 |
| WO | 2016/104762 A1 | 6/2016 |

OTHER PUBLICATIONS

Office Action dated Feb. 7, 2019, issued in EP application No. 15873333.7(counterpart to U.S. Appl. No. 15/539,927)(4 pages).
Extended (Supplementary) European Search Report dated Mar. 6, 2019, issued in EP application No. 16832970.4 (counterpart to U.S. Appl. No. 15/749,148)(9 pages).
Extended (Supplementary) European Search Report dated Mar. 7, 2019, issued in EP application No. 16839019.3 (counterpart to U.S. Appl. No. 15/754,406)(6 pages).
Notice of Allowance dated Mar. 28, 2019, issued in U.S. Appl. No. 15/539,927 (27 pages).
Horiba Scientific, "Particle Size Result Interpretation: Number vs. Volume Distributions", website entry: url: http://www.horiba.com/scientific/products/particle-characterization/education/general-information/data-interpretation/number-vs-volume-distributions/, cited in Notice of Allowance dated Mar. 28, 2019. (4 pages).
Requirement for Restriction Election dated Feb. 8, 2019, issued in U.S. Appl. No. 15/539,946 (5 pages).
Notice of Allowance dated Mar. 20, 2019, issued in U.S. Appl. No. 15/539,926 (28 pages).
International Search Report dated Apr. 12, 2016, issued in counterpart International Application No. PCT/JP2015/086364 (1 page).
International Search Report dated Mar. 8, 2016, issued in International Application No. PCT/JP2015/086362 (2 pages).
International Search Report dated Mar. 8, 2016, issued in International Application No. PCT/JP2015/086363 (2 pages).
International Search Report dated Mar. 29, 2016, issued in International Application No. PCT/JP2015/086365 (2 pages).
Yildirim et al., "Template free preparation of nanoporous organically modified silica thin films on flexible substrates," Journal of Materials Chemistry, 2011, 21, pp. 14830-14837, cited in the specifications of PCT/JP2015/086364 and PCT/JP2015/086365.
Adachi et al., "Preparation of the Silica Gel Monolith by the Sol-Gel Method Using N, N-Dimethylformamide and the Vitrification of the Gel," Yogyo-Kyokai-Shi 95 [10] 1987, pp. 970-975, with English abstract (similar to the disclosure of T. Adachi et al., J. Mater. Sci., 22. 4407-4410, 1987, cited in the specifications of PCT/JP2015/086362 and PCT/JP2015/086363).

Office Action dated Apr. 19, 2018, issued in U.S. Appl. No. 15/539,926. (10 pages).
International Search Report dated Nov. 8, 2016, issued in International Application No. PCT/JP2016/072417 (counterpart of U.S. Appl. No. 15/749,250). (2 pages).
International Search Report dated Nov. 8, 2016, issued in International Application No. PCT/JP2016/072418 (counterpart of U.S. Appl. No. 15/749,148). (3 pages).
International Search Report dated Nov. 8, 2016, issued in International Application No. PCT/JP2016/072452 (counterpart of U.S. Appl. No. 15/754,406). (2 pages).
International Preliminary Report on Patentability (Form PCT/IB/373) dated Jun. 27, 2017 of International Application No. PCT/JP2015/086365(counterpart of U.S. Appl. No. 15/539,927), with Form PCT/ISA/237. (8 pages).
International Preliminary Report on Patentability (Form PCT/IB/373) dated Jun. 27, 2017 of International Application No. PCT/JP2015/086364(counterpart of U.S. Appl. No. 15/539,928), with Form PCT/ISA/237. (11 pages).
International Preliminary Report on Patentability (Form PCT/IB/373) dated Jun. 27, 2017 of International Application No. PCT/JP2015/086363(counterpart of U.S. Appl. No. 15/539,946), with Form PCT/ISA/237. (10 pages).
International Preliminary Report on Patentability (Form PCT/IB/373) dated Jun. 27, 2017 of International Application No. PCT/JP2015/086362(counterpart of U.S. Appl. No. 15/539,926), with Form PCT/ISA/237. (8pages).
International Preliminary Report on Patentability (Form PCT/IB/373) dated Feb. 6, 2018 of International Application No. PCT/JP2016/072418(counterpart of U.S. Appl. No. 15/749,148), with Form PCT/ISA/237. (19 pages).
International Preliminary Report on Patentability (Form PCT/IB/373) dated Feb. 6, 2018 of International Application No. PCT/JP2016/072417(counterpart of U.S. Appl. No. 15/749,250), with Form PCT/ISA/237. (22 pages).
International Preliminary Report on Patentability (Form PCT/IB/373) dated Feb. 27, 2018 of International Application No. PCT/JP2016/072452(counterpart of U.S. Appl. No. 15/754,406), with Form PCT/ISA/237. (8 pages).
Non-Final Office Action dated Jun. 18, 2018, issued in U.S. Appl. No. 15/539,926.
"What is Aerogel?" (Year:2008), cited in Non-Final Office Action dated Jun. 18, 2018, https://web.archive.org/web/20080621095754/http://www.aerogel org/?p=3.
Extended European Search Report dated Jun. 14, 2018, issued in European Patent Application No. 15873333.7 (Corresponds to U.S. Appl. No. 15/539,927).
Markus Börner et al., "Cross-Linked Monolithic Xerogels Based on Silica Nanoparticles", Chemistry of Materials, 2013, pp. 3648-3653.
Baris R. Mutiu et al., Silicon alkoxide cross-linked silica nanoparticles gels for encapsulation of bacterial biocatalysts, Journal of Materials Chemistry A., 2013.
Extended European Search Report dated Jun. 27, 2018, issued in Application No. 15873330.3 (Corresponds to U.S. Appl. No. 15/539,926).
Non-Final Office Action dated Jul. 27, 2018, issued in U.S. Appl. No. 15/539,927.
Extended European Search Report dated Aug. 13, 2018, issued in corresponding Application No. 15873332.9.
Office Action dated Oct. 31, 2018, issued in counterpart Chinese application No. 201580071024.9, with English translation. (11 pages).
Office Action dated Feb. 27, 2019, issued in CN application No. 201580071004.1 (counterpart to U.S. Appl. No. 15/539,927), with partial English translation. (12 pages).
Extended (Supplementary) European Search Report dated Sep. 24, 2018, issued in counterpart application No. 15873331.1. (9 pages).
Office Action dated Jun. 11, 2019, issued in JP application No. 2015-176205 (counterpart to U.S. Appl. No. 15/539,946), with partial English translation. (5 pages).

(56) References Cited

OTHER PUBLICATIONS

Office Action dated Jun. 13, 2019, issued in JP application No. 2015-176204 (counterpart to U.S. Appl. No. 15/539,926), with partial English translation. (5 pages).
Office Action dated Aug. 21, 2019, issued in TW application No. 104143837 (counterpart to U.S. Appl. No. 15/539,927), with partial English translation. (10 pages).
Office Action dated Nov. 6, 2019, issued in CN application No. 201580071018.3 (counterpart to U.S. Appl. No. 15/539,946), with English translation. (13 pages).
Office Action dated Nov. 6, 2019, issued in CN application No. 201580071036.1 (counterpart to U.S. Appl. No. 15/539,926), with English translation. (13 pages).
Office Action dated Jun. 28, 2019, issued in counterpart CN application No. 201580071024.9, with partial machine translation. (12 pages).
Office Action dated Jul. 1, 2019, issued in CN application No. 201680043414.X (counterpart to U.S. Appl. No. 15/754,406), with partial machine translation. (15 pages).
Office Action dated Jun. 26, 2019, issued in TW application No. 104143838 (counterpart to U.S. Appl. No. 15/539,946), with partial English translation. (15 pages).
Office Action dated Aug. 6, 2019, issued in JP application No. 2019-133188 (counterpart to U.S. Appl. No. 15/539,946), with partial English translation. (7 pages).
Office Action dated Jul. 2, 2019, issued in TW application No. 104143841 (counterpart to U.S. Appl. No. 15/539,926), with partial English translation. (11 pages).
Search Report dated May 31, 2019, issued in CN application No. 2016800376799 (counterpart to U.S. Appl. No. 15/749,148). (1 pages).
Office Action dated May 31, 2019, issued in CN application No. 20160037679.9 (counterpart to U.S. Appl. No. 15/749,148), with English translation. (10 pages).
Office Action dated Aug. 26, 2019, issued in EP application No. 15873333.7 (counterpart to U.S. Appl. No. 15/539,927). (3 pages).
Office Action dated Jul. 22, 2019, issued in counterpart TW application No. 104143840, with English translation. (13 pages).
Office Action dated May 18, 2020, issued in CN application No. 201580071024.9 (counterpart to U.S. Appl. No. 16/503,009), with English translation. (27 pages).
Office Action dated Jun. 11, 2020, issued in CN application No. 201680043414.X (counterpart to U.S. Appl. No. 15/754,406), with English translation. (13 pages).
Notice of Allowance dated May 20, 2020, issued in U.S. Appl. No. 16/503,009. (47 pages).
Non-Final Office Action dated Jan. 24, 2020, issued in U.S. Appl. No. 15/539,946. (63 pages).
Office Action dated Dec. 24, 2019, issued in JP application No. 2016-149062 (counterpart to U.S. Appl. No. 15/754,406), with English translation. (6 pages).
Office Action dated Jan. 7, 2020, issued in JP application No. 2016-149060 (counterpart to U.S. Appl. No. 15/749,250), with English translation. (12 pages).
Office Action dated Jan. 7, 2020, issued in JP application No. 2016-149061 (counterpart to U.S. Appl. No. 15/749,148), with English translation. (12 pages).
Office Action dated Mar. 2, 2020, issued in EP application No. 15873333.7 (counterpart to U.S. Appl. No. 15/539,927). (4 pages).
Office Action dated Feb. 4, 2020, issued in TW application No. 105124140 (counterpart to U.S. Appl. No. 15/749,250), with partial English translation. (21 pages).
Office Action dated Feb. 4, 2020, issued in TW application No. 105125188 (counterpart to U.S. Appl. No. 15/754,406), with partial English translation. (12 pages).
Office Action dated Feb. 5, 2020, issued in TW application No. 105124139 (counterpart to U.S. Appl. No. 15/749,148), with partial English translation. (15 pages).
Non-Final Office Action dated Mar. 18, 2020, issued in U.S. Appl. No. 15/754,406. (9 pages).

Office Action dated Mar. 16, 2020, issued in CN application No. 201680037679.9 (counterpart to U.S. Appl. No. 15/749,148), with English translation. (13 pages).
Office Action dated Jan. 5, 2021, issued in JP Application No. 2019-198274, with English translation (10 pages) (counterpart to U.S. Appl. No. 16/503,009).
Final Office Action dated Oct. 27, 2020, issued in U.S. Appl. No. 15/539,946 (8 pages).
Office Action dated Nov. 2, 2020, issued in KR Application No. 10-2017-7035011, with English translation (15 pages) (counterpart to U.S. Appl. No. 15/749,250).
Extended Search Report dated Nov. 25, 2020, issued in EP Application No. 20189340.1 (6 pages) (counterpart to U.S. Appl. No. 15/749,250).
Office Action dated Nov. 19, 2020, issued in EP Application No. 16 832 970.4 (5 pages) (counterpart to U.S. Appl. No. 15/749,148).
Office Action dated Nov. 24, 2020, issued in KR Application No. 10-2017-7035012, with English translation (12 pages) (counterpart to U.S. Appl. No. 15/749,148).
Office Action dated Dec. 2, 2020, issued in KR Application No. 10-2017-7034375, with English translation (11 pages) (counterpart to U.S. Appl. No. 15/754,406).
Non-Final Office Action dated Apr. 7, 2021, issued in U.S. Appl. No. 15/539,946 (16 pages).
Office Action dated Feb. 2, 2021, issued in CN Application No. 201580071024.9. with English translation (11 pages), (counterpart to U.S. Appl. No. 15/539,926).
Non-Final Office Action dated Feb. 3, 2021, issued in U.S. Appl. No. 15/749,148 (86 pages).
Kim, Ho-Cheol et al., "Photopatterned Nanoporous Media", Nano Letters, the American Chemical Society, vol. 4, No. 7, 2004; Cited in Non-Final Office Action dated Feb. 3, 2021.
Final Office Action dated Feb. 24, 2021, issued in U.S. Appl. No. 15/749,250 (25 pages).
Office Action dated Jun. 30, 2021, issued in CN Application No. 201680037716.6, with English Translation. (11 pages—counterpart to U.S. Appl. No. 15/749,250).
Non-Final Office Action dated Aug. 5, 2020, issued in U.S. Appl. No. 15/749,250 (9 pages).
Office Action dated Jul. 31, 2020, issued in CN application No. 201580071036.1 (counterpart to U.S. Appl. No. 16/503,009), with English translation. (17 pages).
Office Action dated Aug. 5, 2020, issued in counterpart CN application No. 201580071018.3 (counterpart to U.S. Appl. No. 15/539,946), with English translation. (18 pages).
Office Action dated Sep. 29, 2020, issued in JP application No. 2016-149062 (counterpart to U.S. Appl. No. 15/754,406), with English translation. (8 pages).
Office Action dated Aug. 13, 2020, issued in TW application No. 105124139 (counterpart to U.S. Appl. No. 15/749,148), with partial English translation. (17 pages).
Final Office Action dated Oct. 16, 2020, issued in U.S. Appl. No. 15/754,406. (11 pages).
Non-Final Office Action dated May 13, 2021, issued in U.S. Appl. No. 15/754,406. (27 pages).
Office Action dated Aug. 19, 2021, issued in counterpart CN Application No. 201580071024.9, with English translation. (17 pages).
Non-Final Action dated Sep. 9, 2021, issued in U.S. Appl. No. 15/749,250. (36 pages).
Office Action dated Sep. 6, 2021, issued in KR application No. 10-2017-7035012 (counterpart to U.S. Appl. No. 15/749,148), with English translation. (3 pages).
Final Office Action dated Oct. 15, 2021, issued in U.S. Appl. No. 15/749,148. (37 pages).
Office Action dated Oct. 18, 2021, issued in KR application No. 10-2017-7034375 (counterpart to U.S. Appl. No. 15/754,406), with English translation. (11 pages).
International Search Report dated Dec. 13, 2016, issued in International Application No. PCT/JP2016/076217 (counterpart to U.S. Appl. No. 15/758,073). (1 page).

(56) References Cited

OTHER PUBLICATIONS

Office Action dated May 8, 2019, issued in CN Application No. 201680051845.0 (counterpart to U.S. Appl. No. 15/758,073), with partial English translation. (12 pages).
Office Action dated Nov. 12, 2019, issued in TW Application No. 105128742 (counterpart to U.S. Appl. No. 15/758,073), with English translation (16 pages).
Office Action dated Apr. 7, 2020, issued in JP application No. 2016-172343 (counterpart to U.S. Appl. No. 15/758,073), with English translation. (4 pages).
Office Action dated May 25, 2020, issued in KR Application No. 10-2018-7008684 (counterpart to U.S. Appl. No. 15/758,073), with Partial translation. (15 pages).
Office Action dated Oct. 20, 2020, issued in JP Application No. 2016-172343 (counterpart to U.S. Appl. No. 15/758,073), with English Translation. (5 pages).
Office Action dated Mar. 26, 2021, issued in KR Application No. 10-2018-7008684 (counterpart to U.S. Appl. No. 15/758,073), with partial English translation (16 pages).
Office Action dated Apr. 13, 2021, issued in JP Application No. 2016-172343 (counterpart to U.S. Appl. No. 15/758,073), with English Translation. (4 pages).
Non-Final Office Action dated Feb. 5, 2020, issued in U.S. Appl. No. 15/758,073. (15 pages).
Non-Final Office Action dated Sep. 3, 2021, issued in U.S. Appl. No. 15/758,073. (38 pages).
Office Action dated Jan. 26, 2022, issued in KR application No. 10-2018-7008684 (counterpart to U.S. Appl. No. 15/758,073), with English translation. (15 pages).
Final Office Action dated Mar. 4, 2022, issued in U.S. Appl. No. 15/758,073. (112 pages).
Office Action dated Jan. 5, 2022, issued in JP application No. 2020-219354 (counterpart to U.S. Appl. No. 15/754,406), with English translation. (6 pages).
Final Office Action dated Jan. 24, 2022, issued in U.S. Appl. No. 15/754,406. (41 pages).
Final Office Action dated Jan. 21, 2022, issued in U.S. Appl. No. 15/539,946. (28 pages).
Office Action dated Jan. 28, 2022, issued in EP application No. 16839019.3 (counterpart to U.S. Appl. No. 15/754,406). (5 pages).
Office Action dated Feb. 8, 2022, issued in EP application No. 15873330.3 (counterpart to U.S. Appl. No. 15/539,926). (7 pages).
Non-Final Office Action dated Apr. 13, 2022, issued in U.S. Appl. No. 15/749,148. (21 pages).
Office Action dated Mar. 17, 2022, issued in CN application No. 201680043414.X (counterpart to U.S. Appl. No. 15/754,406), with partial English translation. (18 pages).
Kunshi Zhang, "Submarine optoelectronic equipment technology", Harbin Engineering University Press, published on Dec. 31, 2012, p. 233, with partial English translation, cited in CN Office Action dated Mar. 17, 2022. (4 pages).
Zhixian Zhang, "Synthetic resin and plastic grade manual", Chemical Industry Press, published on Jan. 31, 2001, the second edition, vol. 2, p. 318, with partial English translation, cited in CN Office Action dated Mar. 17, 2022. (4 pages).
Office Action dated Apr. 6, 2022, issued in CN application No. 202010325596.8 (counterpart to U.S. Appl. No. 15/539,927), with English translation. (8 pages).
Office Action dated May 20, 2022, issued in KR application No. 10-2017-7018505 (counterpart to U.S. Appl. No. 15/539,946), with English translation. (13 pages).
Office Action dated May 30, 2022, issued in KR application No. 10-2017-7018502 (counterpart to U.S. Appl. No. 15/539,926), with English translation. (15 pages).
Office Action dated May 30, 2022, issued in KR application No. 10-2017-7018503 (counterpart to U.S. Appl. No. 15/539,946), with English translation. (17 pages).
Office Action dated Jun. 2, 2022, issued in KR application No. 10-2017-7018507 (counterpart to U.S. Appl. No. 15/539,927), with English translation. (13 pages).
Office Action dated Jun. 3, 2021, issued in CN application No. 202010325596.8 (counterpart to U.S. Appl. No. 15/539,927), with English translation. (13 pages).
Office Action dated Jul. 12, 2022, issued in JP application No. 2021-115086 (counterpart to U.S. Appl. No. 15/758,073, with English translation. (5 pages).
Non-Final Office Action dated Aug. 4, 2022, issued in U.S. Appl. No. 15/539,946. (5 pages).
Office Action dated Aug. 26, 2022, issued in KR application No. 10-2018-7008684 (counterpart to U.S. Appl. No. 15/758,073, with English translation (17 pages).
Notice of Allowance dated Aug. 3, 2022, issued in U.S. Appl. No. 15/758,073. (27 pages).

\* cited by examiner

LAMINATED FILM ROLL AND METHOD OF PRODUCING THE SAME

TECHNICAL FIELD

The present invention relates to a laminated film roll and a method of producing the same.

BACKGROUND ART

Disposing two substrates at a regular spacing forms an air layer which is a void space between the substrates. The air layer formed between the substrates serves as a low refractive layer that reflects light entirely, for example. Thus, for example, in the case of an optical film, components such as a prism, a polarizing film, and a polarizing plate are disposed at regular spacings to provide air layers each of which serves as a low refractive index layer between the components. Forming air layers in such a manner, however, requires to dispose the components at regular spacings, which prevents the components from being stacked sequentially and causes time and trouble in production.

For solving such problems, there are attempts to develop a member such as a film having a low refractive index as a substitute for an air layer which is a void space between the components. As an example of such a member, which achieves a high porosity and a high strength, there are methods of applying the member to an antireflection layer of a lens (for example, see Patent Documents 1 to 4). In each of these methods, a layer with void spaces (hereinafter, also referred to as a "void-provided layer") is formed on a lens and then baked at a high temperature of 150° C. or more for a long time. These methods, however, have the following problem. Since the thus obtained void-provided layer is inferior in flexibility, the layer cannot be formed on a soft resin film, which does not allow continuous production in the shape of a roll. On the other hand, there is an example of application of a void-provided layer which has not been subjected to baking treatment (for example, see Non-Patent Document 1). This method, however, has the following problem. Since the thus obtained void-provided layer is inferior in film strength, an impact resistance cannot be imparted, which does not allow continuous production in the shape of a roll.

There are also examples disclosing the method of forming a silica aerogel film on a long resin support (for example, see Patent Documents 5 and 6). These methods, however, have the following problem. Since the thus obtained void-provided layer has a refractive index of more than 1.30, the layer cannot be a substitute for an air layer at all.

CITATION LIST

Patent Document (s)

Patent Document 1: JP 2006-297329 A
Patent Document 2: JP 2006-221144 A
Patent Document 3: JP 2006-011175 A
Patent Document 4: JP 2008-040171 A
Patent Document 5: JP 2006-096019 A
Patent Document 6: JP 2006-096967 A

Non-Patent Document(s)

Non-Patent Document 1: J. Mater. Chem., 2011, 21, 14830-14837

BRIEF SUMMARY OF THE INVENTION

Problem to be Solved by the Invention

There has not been reported a long laminated film roll including an ultra-low refractive index layer that achieves both flexibility and a film strength and allows continuous production in the shape of a roll. Hence, the present invention is intended to provide a long laminated film roll including an ultra-low refractive index layer having a refractive index of 1.20 or less, which can be a substitute for an air layer, for example.

Means for Solving Problem

In order to achieve the above object, the present invention provides a laminated film roll including an ultra-low refractive index layer having a refractive index of 1.20 or less; and a resin film, wherein the ultra-low refractive index layer is stacked on the resin film.

The present invention also provides a laminated film including: an ultra-low refractive index layer having a refractive index of 1.20 or less; and a resin film, wherein the ultra-low refractive index layer is stacked on the resin film, and in the ultra-low refractive index layer, an abrasion resistance showing a film strength, measured with BEMCOT® is in a range from 60% to 100% and a folding endurance showing flexibility, measured by an MIT test is 100 times or more.

The present invention also provides a method of producing the laminated film roll according to the present invention, including steps of: preparing a liquid containing one kind or two or more kinds of structural units that form a structure with minute void spaces; coating a resin film with the liquid; and drying the liquid applied on the resin film.

The present invention also provides an optical element including the ultra-low refractive index layer of the laminated film roll or the laminated film according to the present invention.

Effects of the Invention

The laminated film roll of the present invention having the above-described properties achieves an ultra-low refractive index layer having a refractive index of 1.20 or less which can be a substitute for an air layer as well as allows continuous production in the shape of a roll, for example. Thus, there is no need to provide air layers by disposing components at regular spacings for achieving an ultra-low refractive index. By disposing the ultra-low refractive index layer of the present invention at a desired site, an ultra-low refractive index can be imparted as well as a continuous production at low cost can be performed. Thus, the laminated film roll of the present invention is very useful to an optical element which requires an ultra-low refractive index, for example.

DETAILED DESCRIPTION OF THE INVENTION

Figure 1:
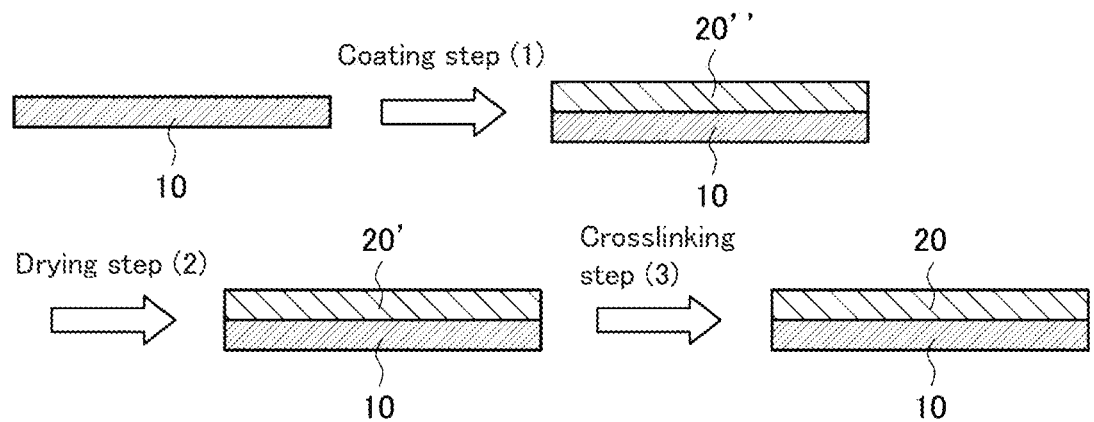
FIG. 1 is a process cross sectional view schematically showing an example of the method of forming an ultra-low refractive index layer 20 on a resin film 10 in the present invention.

In the ultra-low refractive index layer of the laminated film roll of the present invention, for example, the abrasion resistance showing a film strength, measured with BEMCOT® is in the range from 60% to 100% and the folding endurance showing flexibility, measured by the MIT test is 100 times or more.

In the ultra-low refractive index layer of the laminated film roll of the present invention, one kind or two or more kinds of structural units that form a structure with minute void spaces may be chemically bonded. The chemical bond among the structural units may include a direct bond or an indirect bond, for example. Note that, in the ultra-low refractive index layer of the laminated film roll of the present invention, it is only required that at least some of the structural units are chemically bonded, for example. Specifically, there may be a part at which the structural units are in contact with each another but not chemically bonded, for example. Note that, in the present invention, "the structural units are "indirectly bonded"" means that the structural units are bonded through binder components each of which is smaller in amount than the amount of the structural unit. On the other hand, "the structural units are "directly bonded"" means that the structural units are bonded one another directly without involving binder components and the like.

In the ultra-low refractive index layer of the laminated film roll of the present invention, for example, the bond among the structural units includes a hydrogen bond or a covalent bond. The structural units may be in the shape of at least one of a particle, fiber, and a plate, for example. Each of the structural unit in the shape of a particle and the structural unit in the shape of a plate may be made of an inorganic matter, for example. The configuration element of the structural unit in the shape of a particle may include at least one element selected from the group consisting of Si, Mg, Al, Ti, Zn, and Zr, for example. The structure (structural unit) in the shape of a particle may be a solid particle or a hollow particle, and specific examples thereof include silicon particles, silicon particles with micropores, silica hollow nanoparticles, and silica hollow nanoballoons. The structural unit in the shape of fiber can be, for example, nanofiber having a nano-sized diameter, and specific examples thereof include cellulose nanofiber and alumina nanofiber. The structural unit in the shape of a plate can be, for example, nanoclay. Specifically, the structural unit in the shape of a plate can be, for example, nano-sized bentonite (for example, Kunipia F [product name]). The structural unit in the shape of fiber may be at least one selected from the group consisting of carbon nanofiber, cellulose nanofiber, alumina nanofiber, chitin nanofiber, chitosan nanofiber, polymer nanofiber, glass nanofiber, and silica nanofiber, for example, although it is not particularly limited.

The ultra-low refractive index layer of the laminated film roll of the present invention is, for example, a porous body containing microporous particles. In the present invention, the shape of the "particle" (for example, the microporous particle) is not limited to particular shapes, and can be, for example, a spherical shape, a non-spherical shape, and the like. Furthermore, in the present invention, the microporous particle may be, for example, a sol-gel beaded particle, a nanoparticle (hollow nanosilica/nanoballoon particle), nanofiber, and the like as described above.

The ultra-low refractive index layer of the laminated film roll of the present invention has a proportion of void space of 40% or more, for example.

The laminated film roll of the present invention has a pore size in the range from 2 to 200 nm, for example.

The laminated film roll of the present invention has a thickness in the range from 0.01 to 100 μm, for example.

The laminated film roll of the present invention has a haze showing transparency of less than 5%, for example.

The method of producing a laminated film roll of the present invention further comprises a step of adding a catalyst for chemically bonding the microporous particles to the liquid in the liquid preparing step, for example.

In the method of producing a laminated film roll of the present invention, for example, the catalyst is a catalyst for promoting the crosslinking bond among the microporous particles.

In the method of producing a laminated film roll of the present invention, for example, the structural units are directly bonded to form the ultra-low refractive index layer.

In the method of producing a laminated film roll of the present invention, for example, the structural units are indirectly bonded to form the ultra-low refractive index layer.

In the method of producing a laminated film roll of the present invention, for example, the ultra-low refractive index layer is formed such that the bond among the structural units includes a hydrogen bond or a covalent bond.

In the method of producing a laminated film roll of the present invention, for example, the structural units are in the shape of at least one of a particle, fiber, and a plate. Each of the structural unit in the shape of a particle and the structural unit in the shape of a plate may be made of an inorganic matter, for example. The configuration element of the structural unit in the shape of a particle may include at least one element selected from the group consisting of Si, Mg, Al, Ti, Zn, and Zr, for example. The structural unit may include a microporous particle, for example.

The present invention is described below in more detail with reference to illustrative examples. The present invention, however, is not limited or restricted by the following description.

[1. Laminated Film Roll]

The laminated film roll of the present invention includes: an ultra-low refractive index layer having a refractive index of 1.20 or less; and a resin film, wherein the ultra-low refractive index layer is stacked on the resin film as described above. Instead of this, as described above, the present invention may be a laminated film including: an ultra-low refractive index layer having a refractive index of 1.20 or less; and a resin film, wherein the ultra-low refractive index layer is stacked on the resin film, the abrasion resistance showing a film strength, measured with BEMCOT® is in the range from 60% to 100% and the folding endurance showing flexibility, measured by the MIT test is 100 times or more.

The resin film is not limited to particular resin films, and examples of the resin include thermoplastic resins with superior transparency such as polyethylene terephthalate (PET), acryl, cellulose acetate propionate (CAP), cycloolefin polymer (COP), triacetate (TAC), polyethylene naphthalate (PEN), polyethylene (PE), and polypropylene (PP).

The ultra-low refractive index layer (hereinafter, also referred to as an "ultra-low refractive index layer of the present invention") of the laminated film roll or the laminated film of the present invention may be directly stacked on the resin film or indirectly stacked on the resin film through another layer, for example.

When the ultra-low refractive index layer of the present invention is formed on the resin film, for example, the present invention can be a low refractive material having the above-described properties, including: the ultra-low refractive index layer and the resin film, wherein the ultra-low refractive index layer is stacked on the resin film, for example.

The ultra-low refractive index layer of the present invention has an abrasion resistance showing a film strength, measured with BEMCOT® in the range from 60% to 100% as described above. The present invention having such a film strength is resistant to a physical impact in winding during production and in use, for example. The lower limit of the abrasion resistance is, for example, 60% or more, 80% or more, or 90% or more, the upper limit thereof is, for example, 100% or less, 99% or less, or 98% or less, and the abrasion resistance is, for example, in the range from 60% to 100%, 80% to 99%, or 90% to 98%.

In the ultra-low refractive index layer of the laminated film roll or the laminated film of the present invention, for example, the abrasion resistance showing a film strength, measured with BEMCOT® is in the range from 60% to 100% and the folding endurance showing flexibility, measured by an MIT test is 100 times or more. When the ultra-low refractive index layer includes silicon (Si), for example, the abrasion resistance can be measured according to the method described below. When the ultra-low refractive index layer includes an element other than silicon (Si), for example, the abrasion resistance can be measured with reference to the method described below.

(Evaluation of Abrasion Resistance)

(1) A void-provided layer (the ultra-low refractive index layer of the present invention) formed on an acrylic film by coating is cut into a circle having a diameter of about 15 mm as a sample.

(2) Next, as to the sample, the coating amount of Si ($Si_0$) is measured by identifying silicon by X-ray fluorescence (product of Shimadzu Corporation, product name: ZSX Primus II). Subsequently, the void-provided layer on the acrylic film in proximity to the site where the circular sample was obtained is cut so as to have a piece having a size of 50 mm×100 mm, the obtained piece is fixed to a glass plate (thickness: 3 mm), and a sliding test is performed using BEMCOT®. The sliding condition is as follows: weight: 100 g, reciprocation: 10 times.

(3) The sampling and X-ray fluorescence measurement of the void-provided layer after finishing sliding are performed in the same manner as the above described item (1) to measure the residual amount of Si ($Si_1$) after an abrasion test. The abrasion resistance is defined by the residual ratio of Si (%) before and after the sliding test using BEMCOT®, and is represented by the following formula.

abrasion resistance (%)=[residual amount of Si ($Si_1$)/ Si coating amount ($Si_0$)]×100(%)

The folding endurance of the ultra-low refractive index layer of the present invention measured by the MIT test is, for example, 100 times or more as described above. The folding endurance shows flexibility, for example. Since the present invention has such flexibility, for example, a superior winding ability in continuous production and a superior handleability in use can be achieved, for example.

The lower limit of the folding endurance is, for example, 100 times or more, 500 times or more, or 1000 times or more, the upper limit of the folding endurance is not limited to particular values and is, for example, 10000 times or less, and the folding endurance is, for example, in the range from 100 to 10000 times, 500 to 10000 times, or 1000 to 10000 times.

The flexibility means deformability of a substance, for example. The folding endurance by the MIT test can be measured, for example, by the method described below.

(Evaluation of Folding Endurance Test)

The void-provided layer (the ultra-low refractive index layer of the present invention) is cut into a piece having a size of 20 mm×80 mm, then the obtained piece is attached to a MIT folding endurance tester (production of TESTER SANGYO CO., LTD., product name: BE-202), and 1.0 N load is applied thereto. A chuck of R 2.0 mm for holding the void-provided layer is used, application of load is at most 10000 times, and the number of times of application of load at the time of fracture of the void-provided layer is assumed as the folding endurance.

The film density of the ultra-low refractive index layer of the present invention is not limited to particular values, and the lower limit thereof is, for example, 1 $g/cm^3$ or more, 10 $g/cm^3$ or more, 15 $g/cm^3$ or more, the upper limit thereof is, for example, 50 $g/cm^3$ or less, 40 $g/cm^3$ or less, or 30 $g/cm^3$ or less, or 2.1 $g/cm^3$ or less, and the film density is, for example, in the range from 5 to 50 $g/cm^3$, 10 to 40 $g/cm^3$, 15 to 30 $g/cm^3$, or 1 to 2.1 $g/cm^3$. In the ultra-low refractive index layer of the present invention, the lower limit of the porosity based on the film density is, for example, 50% or more, 70% or more, or 85% or more, the upper limit thereof is, for example, 98% or less or 95% or less, and the porosity is, for example, in the range from 50% to 98%, 70% to 95%, or 85% to 95%.

The film density can be measured, for example, by the method described below, and the porosity can be calculated, for example, as described below based on the film density.

(Evaluation of Film Density and Porosity)

After forming a void-provided layer (the ultra-low refractive index layer of the present invention) on a base (acrylic film), the X-ray reflectivity in a total reflection region of the void-provided layer of this laminate is measured using an X-ray diffractometer (product of RIGAKU, product name: RINT-2000). Then, after fitting with Intensity at 2θ, the film density (g/cm$^3$) is calculated from the total reflection angle of the laminate (void-provided layer and base), and the porosity (P %) is calculated by the following formula.

porosity (P %)=45.48×film density (g/cm$^3$)+100(%)

The ultra-low refractive index layer has a pore structure. The size of a void space (pore) in the present invention indicates not the diameter of the short axis but the diameter of the long axis of the void space. The size of a void space (pore) is preferably in the range from 2 nm to 500 nm, for example. The lower limit of the size of a void space is, for example, 2 nm or more, 5 nm or more, 10 nm or more, or 20 nm or more, the upper limit of the size of a void space is, for example, 500 nm or less, 200 nm or less, or 100 nm or less, and the size of a void space is, for example, in the range from 2 nm to 500 nm, 5 nm to 500 nm, 10 nm to 200 nm, or 20 nm to 100 nm. A preferable size of a void space changes depending on applications of the void-provided structure. Thus, the size of a void space should be adjusted to a desired size according to purposes, for example. The size of a void space can be evaluated by the method described below.

(Evaluation of Size of Void Space)

In the present invention, the size of a void space can be quantified according to the BET test. Specifically, 0.1 g of a sample (the ultra-low refractive index layer of the present invention) is set in the capillary of a surface area measurement apparatus (product of Micromeritics, product name: ASAP 2020), and dried under a reduced pressure at room temperature for 24 hours to remove gas in the void-provided structure. Then, an adsorption isotherm is created by adsorbing a nitrogen gas to the sample, thereby obtaining a pore distribution. The size of a void space can thereby be evaluated.

It is only required that the ultra-low refractive index layer of the present invention has a pore structure (porous structure) as described above, for example, and the ultra-low refractive index layer may have an open-cell structure in which the pore structures are interconnected, for example. The open-cell structure means, for example, that the pore structures are three-dimensionally interconnected in the ultra-low refractive index layer (for example, silicon porous body) of the present invention, i.e., void spaces in the pore structures are interconnected. When a porous body has an open-cell structure, the porosity of the bulk body can be increased. However, an open-cell structure cannot be formed with closed-cell particles such as hollow silica. In this regard, for example, when the silica sol particle (pulverized product of a gelled silicon compound which forms sol) is used, since the particles have a three-dimensional dendritic structure, the ultra-low refractive index layer of the present invention can form an open-cell structure easily by settlement and deposition of the dendritic particles in a coating film (sol coating film containing the pulverized products of a gelled silicon compound). The ultra-low refractive index layer of the present invention preferably forms a monolith structure in which the open-cell structure has multiple pore distributions. The monolith structure denotes a hierarchical structure including a structure in which nano-sized void spaces are present and an open-cell structure in which the nano-sized spaces are aggregated, for example. The monolith structure can impart a film strength with minute void spaces while imparting a high porosity with coarse open-cell structure, which achieve both a film strength and a high porosity, for example. For forming such a monolith structure, for example, it is preferable to control the pore distribution of a void-provided structure to be created in a gel (gelled silicon compound) before pulverizing into the silica sol particles. For example, by controlling the particle size distribution of silica sol particles after pulverization to a desired size in pulverization of the gelled silicon compound, the monolith structure can be formed.

In the ultra-low refractive index layer of the present invention, the haze showing transparency is not limited to particular values, and the upper limit thereof is, for example, less than 5% and preferably less than 3%, the lower limit thereof is, for example, 0.1% or more or 0.2% or more, and the haze is, for example, 0.1% or more and less than 5% or 0.2% or more and less than 3%.

The haze can be measured, for example, by the method described below.

(Evaluation of Haze)

A void-provided layer (the ultra-low refractive index layer of the present invention) is cut into a piece having a size of 50 mm×50 mm, and the obtained piece is set to a haze meter (product of Murakami Color Research Laboratory, product name: HM-150) to measure a haze. The haze value is calculated by the following formula.

haze (%)=[diffuse transmittance (%)/total light transmittance (%)]×100(%)

Commonly, a ratio between the transmission speed of the wavefront of light in vacuum and the phase velocity of light in a medium is called a refractive index of the medium. The upper limit of the refractive index of the ultra-low refractive index layer of the present invention is, for example, 1.20 or less or 1.15 or less, the lower limit thereof is, for example, 1.05 or more, 1.06 or more, or 1.07 or more, and the refractive index is, for example, in the range from 1.05 to 1.20, 1.06 to 1.20, or 1.07 to 1.15.

In the present invention, the refractive index is a refractive index measured at the wavelength of 550 nm unless otherwise stated. The method of measuring a refractive index is not limited to particular methods, and the refractive index can be measured, for example, by the method described below.

(Evaluation of Refractive Index)

After forming a void-provided layer (the ultra-low refractive index layer of the present invention) on an acrylic film, the obtained laminate is cut into a piece having a size of 50 mm×50 mm, and the obtained piece is adhered on the front surface of a glass plate (thickness: 3 mm) through a pressure-sensitive adhesive layer. The center of the back surface of the glass plate (diameter: about 20 mm) is solidly painted with a black magic marker, thereby preparing a sample which allows no reflection at the back surface of the glass plate. The sample is set to an ellipsometer (product of J.A. Woollam Japan, product name: VASE), the refractive index is measured at the wavelength of 500 nm and at the incidence angle of 50° to 80°, and the average value is assumed as a refractive index.

When the ultra-low refractive index layer of the present invention is formed on the resin film, for example, the peel strength showing adhesion between the ultra-low refractive index layer and the resin film is not limited to particular values, and the lower limit thereof is, for example, 1 N/25 mm or more, 2 N/25 mm or more, or 3 N/25 mm or more, the upper limit thereof is, for example, 30 N/25 mm or less, 20 N/25 mm or less, or 10 N/25 mm or less, and the peel strength is, for example, in the range from 1 to 30 N/25 mm, 2 to 20 N/25 mm, or 3 to 10 N/25 mm.

The method of measuring the peel strength is not limited to particular methods, and the peel strength can be measured by the method described below, for example.

(Evaluation of Peel Strength)

After forming the void-provided layer (the ultra-low refractive index layer of the present invention) on the resin film (for example, acrylic film), a piece having a size of 50 mm×140 mm is obtained as a sample and the sample is fixed to a stainless plate with a double-sided tape. An acrylic pressure-sensitive adhesive layer (thickness 20 μm) is adhered to a PET film (product of Mitsubishi Plastics, Inc., product name: T100), the thus obtained adhesive tape is cut into a piece having a size of 25 mm×100 mm, and the obtained piece is adhered to the void-provided layer to form a laminate of the PET film and the void-provided layer. Then, the sample is chucked in a tensile testing machine (product of Shimadzu Corporation, product name: AG-Xplus) with a chuck space of 100 mm, and the tensile test is performed at the tensile speed of 0.3 m/min. The average of 50 mm peel test is assumed as the peel strength.

The thickness of the ultra-low refractive index layer of the present invention is not limited to particular values, and the lower limit thereof is, for example, 0.01 μm or more, 0.05 μm or more, 0.1 μm or more, or 0.3 μm or more, the upper limit thereof is, for example, 100 μm or less, 80 μm or less, 50 μm or less, or 10 μm or less, and the thickness is, for example, in the range from 0.01 to 100 μm.

As described above, the ultra-low refractive index layer of the present invention includes pulverized products of a gelled compound, wherein the pulverized products are chemically bonded by catalysis, for example. In the ultra-low refractive index layer of the present invention, the pattern of the chemical bond among the pulverized products is not limited to particular patterns. Specifically, the chemical bond can be, for example, a crosslinking bond. The method of chemically bonding the pulverized products is described in detail in the description as to the production method of the present invention.

The gel form of the gelled compound is not limited to particular forms. The "gel" commonly denotes a solidified state of solutes aggregated as they lost independent motility due to interaction. Commonly, a wet gel is a gel containing a dispersion medium in which solutes build a uniform structure, and a xerogel is a gel from which a solvent is removed and in which solutes form a network structure with void spaces. In the present invention, the gelled compound can be a wet gel or a xerogel, for example.

The gelled compound can be, for example, a gelled product obtained by gelating monomer compounds. Specifically, the gelled silicon compound can be, for example, a gelled product in which the monomer silicon compounds are bonded. As a specific example, the gelled silicon compound can be a gelled product in which the monomer silicon compounds are bonded by a hydrogen bond or an intermolecular bond. The bond can be, for example, a bond by dehydration condensation. The method of gelation is described below in the description as to the production method of the present invention.

In the ultra-low refractive index layer of the present invention, the volume average particle size showing particle size variations of the pulverized product is not limited to particular values, and the lower limit thereof is, for example, 0.10 μm or more, 0.20 μm or more, or 0.40 μm or more, the upper limit thereof is, for example, 2.00 μm or less, 1.50 μm or less, or 1.00 μm or less, and the volume average particle size is, for example, in the range from 0.10 μm to 2.00 μm, 0.20 μm to 1.50 μm, or 0.40 μm to 1.00 μm. The particle size distribution can be measured, for example, using a particle size distribution analyzer based on dynamic light scattering, laser diffraction, or the like or using an electron microscope such as a scanning electron microscope (SEM) or a transmission electron microscope (TEM).

The particle size distribution showing particle size variations of the pulverized product is not limited to particular values. The distribution of the particle having a particle size of 0.4 μm to 1 μm is in the range from 50 wt % to 99.9 wt %, 80 wt % to 99.8 wt %, or 90 wt % to 99.7 wt % or the distribution of the particle having a particle size of 1 μm to 2 μm is in the range from 0.1 wt % to 50 wt %, 0.2 wt % to 20 wt %, or 0.3 wt % to 10 wt %, for example. The particle size distribution can be measured, for example, using a particle size distribution analyzer or an electron microscope.

In the ultra-low refractive index layer of the present invention, the type of the gelled compound is not limited to particular types. The gelled compound can be, for example, a gelled silicon compound. The present invention is described below with reference to an example in which the gelled compound is a gelled silicon compound. The present invention, however, is not limited thereto.

The crosslinking bond is, for example, a siloxane bond. Examples of the siloxane bond include T2 bond, T3 bond, and T4 bond shown below. In the case where the ultra-low refractive index layer of the present invention has the siloxane bond, the porous body of the present invention may have one of, two of, or all of the above-mentioned three bond patterns, for example. The silicone porous body having higher proportions of T2 and T3 is superior in flexibility and can be expected to have an original property of a gel but is inferior in film strength. On the other hand, the silicone porous body having a higher proportion of T4 is superior in film strength but has small sized void spaces and is inferior in flexibility. Thus, it is preferable to change the proportions of T2, T3, and T4 depending on applications, for example.

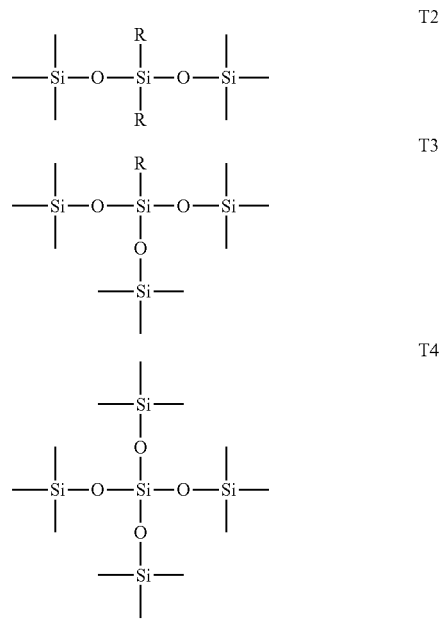

In the case where the ultra-low refractive index layer of the present invention has the siloxane bond, the relative ratio among T2, T3, and T4 with T2 being considered as "1" is, for example, as follows: T2:T3:T4=1:[1 to 100]:[0 to 50], 1:[1 to 80]:[1 to 40], or 1:[5 to 60]:[1 to 30].

The silicon atoms contained in the ultra-low refractive index layer of the present invention are preferably bonded by a siloxane bond, for example. As a specific example, the proportion of the unbonded silicon atoms (i.e., residual silanol) among all the silicon atoms contained in the ultra-low refractive index layer is, for example, less than 50%, 30% or less, or 15% or less.

When the gelled compound is the gelled silicon compound, the monomer silicon compound is not limited to particular compounds. The monomer silicon compound can be, for example, a compound represented by the following chemical formula (1). When the gelled silicon compound is a gelled product in which monomer silicon compounds are bonded by a hydrogen bond or an intermolecular bond as described above, monomers in the chemical formula (1) can be bonded by a hydrogen bond through their hydroxyl groups, for example.

(1)

In the chemical formula (1), for example, X is 2, 3, or 4, and $R^1$ represents a linear or a branched alkyl group. The carbon number of $R^1$ is, for example, 1 to 6, 1 to 4, or 1 to 2. Examples of the linear alkyl group include a methyl group, an ethyl group, a propyl group, a butyl group, a pentyl group, and a hexyl group, and examples of the branched alkyl group include an isopropyl group and an isobutyl group. The X is, for example, 3 or 4.

A specific example of the silicon compound represented by the chemical formula (1) can be a compound represented by the chemical formula (1'), wherein X is 3. In the chemical formula (1'), $R^1$ is the same as that in the chemical formula (1), and is, for example, a methyl group. When $R^1$ represents a methyl group, the silicon compound is tris(hydroxy) methylsilane. When X is 3, the silicon compound is, for example, trifunctional silane having three functional groups.

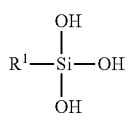
(1')

A specific example of the silicon compound represented by the chemical formula (1) can be a compound represented by the chemical formula (1') wherein X is 4. In this case, the silicon compound is, for example, tetrafunctional silane having four functional groups.

The monomer silicon compound may be, for example, a hydrolysate of a silicon compound precursor. The silicon compound precursor is not limited as long as it can generate the silicon compound by hydrolysis, for example. A specific example of the silicon compound precursor can be a compound represented by the following chemical formula (2).

(2)

In the chemical formula (2), for example, X is 2, 3, or 4, $R^1$ and $R^2$ each represent a linear or branched alkyl group, $R^1$ and $R^2$ may be the same or different, $R^1$ may be the same or different in the case where X is 2, and $R^2$ may be the same or different.

X and $R^1$ are the same as those in the chemical formula (1), for example. Regarding $R^2$, for example, reference can be made to the examples of $R^1$ in the chemical formula (1).

A specific example of the silicon compound precursor represented by the chemical formula (2) can be a compound represented by the chemical formula (2') wherein X is 3. In the chemical formula (2'), $R^1$ and $R^2$ are the same as those in the chemical formula (2). When $R^1$ and $R^2$ both represent methyl groups, the silicon compound precursor is trimethoxy(methyl)silane (hereinafter, also referred to as "MTMS").

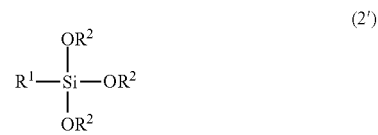
(2')

The monomer silicon compound is preferably the trifunctional silane because it is superior in the lowness of refractive index. Also, the monomer silicon compound is preferably the tetrafunctional silane because it is superior in strength (for example, abrasion resistance). Regarding the monomer silicon compounds which are raw materials of the gelled silicon compound, one of the compounds may be used alone or two or more of them may be used in combination, for example. As a specific example, the monomer silicon compound may include only the trifunctional silane, only the tetrafunctional silane, or both of the trifunctional silane and the tetrafunctional silane, and may further include other silicon compounds, for example. When two or more kinds of silicon compounds are used as the monomer silicon compound, the ratio between the compounds is not limited to particular values and can be determined appropriately.

The ultra-low refractive index layer of the present invention may contain a catalyst for chemically bonding one kind or two or more kinds of structural units that form a structure with minute void spaces, for example. The content of the catalyst is not limited to particular values, and the content of the catalyst relative to the weight of the structural unit is, for example, 0.01 wt % to 20 wt %, 0.05 wt % to 10 wt %, or 0.1 wt % to 5 wt %.

The ultra-low refractive index layer of the present invention may further contain a crosslinking assisting agent for indirectly bonding one kind or two or more kinds of structural units that form a structure with minute void spaces, for example. The content of the crosslinking assisting agent is not limited to particular values, and the content of the crosslinking assisting agent relative to the weight of the structural unit is, for example, 0.01 wt % to 20 wt %, 0.05 wt % to 15 wt %, or 0.1 wt % to 10 wt %.

The form of the ultra-low refractive index layer of the present invention is not limited to particular forms, and is normally in the form of a film.

The ultra-low refractive index layer of the present invention is, for example, a roll. For example, the present invention may further include a resin film, and the ultra-low refractive index layer may be formed on the long resin film as described above. In this case, another long film may be stacked on the laminated film of the present invention.

Specifically, another long resin film (for example, interleaving paper, release film, surface protection film, or the like) may be stacked on the laminated film of the present invention including the resin film and the ultra-low refractive index layer, and then the obtained laminate may be wound in the form of a roll.

The method of producing a laminated film roll of the present invention is not limited to particular methods, and the laminated film of the present invention can be produced, for example, by the production method of the present invention described below.

[2. Production Method of Laminated Film Roll]

The method of forming a laminated film roll of the present invention preferably includes steps of: preparing a liquid containing microporous particles; coating a resin film with the liquid; and drying the liquid applied on the resin film as described above. The present invention, however, is not limited thereto. The liquid containing the microporous particles (hereinafter may be also referred to as a "microporous particle-containing liquid") is not limited to particular liquids, and can be, for example, a suspension containing the microporous particles. The present invention is described below mainly with reference to an example in which the microporous particle is a pulverized product of a gelled compound and the ultra-low refractive index layer is a porous body (preferably, silicone porous body) including pulverized products of a gelled compound. The present invention, however, can be performed in the same manner also in the case where the microporous particle is something other than the pulverized product of a gelled compound. In the production method of the laminated film roll of the present invention, the ultra-low refractive index layer is, for example, a porous body in which microporous particles are chemically bonded, and the microporous particles are chemically bonded in the ultra-low refractive index layer forming step. The microporous particle is, for example, a silicon compound microporous particle and the porous body is a silicone porous body. The silicon compound microporous particle includes, for example, a pulverized product of a gelled silica compound. Another embodiment of the ultra-low refractive index layer includes a void-provided layer including fibrous substances such as nanofiber, wherein the fibrous substances are entangled to form a layer with void spaces. The production method of a void-provided layer including fibrous substances is the same as that of the layer including microporous particles. Besides the aforementioned embodiment, the ultra-low refractive index layer includes a void-provided layer formed by using hollow nanoparticles and nanoclay, and a void-provided layer made by using hollow nanoballoons and magnesium fluoride. These ultra-low refractive index layers may be void-provided layers made of a single configuration substance or of multiple configuration substances. The void-provided layer may be the layer adopting one of the aforementioned embodiments or the layer adopting more than one of the aforementioned embodiments. The present invention is described below mainly with reference to the void-provided layer of a porous body in which the microporous particles are chemically bonded.

The production method of the present invention forms an ultra-low refractive index layer which is superior in the lowness of refractive index. The following theory about the reason for this can be formed. The present invention, however, is not limited thereto.

Since the pulverized product used in the production method of the present invention is obtained by pulverizing the gelled silicon compound, the three-dimensional structure of the gelled silicon compound before pulverization is dispersed into three-dimensional basic structures. In the production method of the present invention, the precursor having a porous structure based on the three-dimensional basic structures is formed by coating the base with the pulverized products of a gelled silicon compound. That is, according to the production method of the present invention, a new porous structure is formed of the pulverized products each having the three-dimensional basic structure, which is different from the three-dimensional structure of the gelled silicon compound. Thus, the finally obtained ultra-low refractive index layer brings about an effect of a low refractive index equivalent to an air layer, for example. Moreover, in the production method of the present invention, since the pulverized products are chemically bonded, the new three-dimensional structure is immobilized. Thus, the finally obtained ultra-low refractive index layer, despite its structure with void spaces, can maintain a sufficient strength and sufficient flexibility. The ultra-low refractive index layer obtained by the production method of the present invention is useful as a substitute for the air layer, in an aspect of low refractive index as well as in strength and flexibility, for example. In the case of an air layer, the air layer is formed between the components by stacking components with a space by providing a spacer or the like therebetween. The ultra-low refractive index layer obtained by the production method of the present invention can achieve a low refractive index equivalent to the air layer only by disposing it at a desired site, for example. Thus, as described above, the present invention can impart a low refractive index equivalent to the air layer easier and simpler than forming the air layer.

Regarding the production method of the present invention, reference can be made to the description as to the ultra-low refractive index layer of the present invention unless otherwise stated.

Regarding the gelled compound, the pulverized product thereof, the monomer compound, and the precursor of the monomer compound in the production method of the present invention, reference can be made to the description as to the porous structure of the present invention.

The production method of the present invention includes a step of preparing a liquid containing microporous particles as described above. When the microporous particle is a pulverized product of a gelled compound, the pulverized product can be obtained, for example, by pulverizing the gelled compound. By pulverization of the gelled compound, as described above, the three-dimensional structure of the gelled compound is destroyed and dispersed into three-dimensional basic structures.

Generation of the gelled compound by gelation of the monomer compound and preparation of the pulverized product by pulverization of the gelled compound are described below. The present invention, however, is not limited thereto.

The gelation of the monomer compound can be performed, for example, by bonding the monomer compounds by a hydrogen bond or an intermolecular bond.

The monomer compound can be, for example, a silicon compound represented by the chemical formula (1) described in the description as to the ultra-low refractive index layer of the present invention.

(1)

Since the silicon compound represented by the chemical formula (1) has a hydroxyl group, monomers in the chemical formula (1) can be bonded by a hydrogen bond or an intermolecular bond through their hydroxyl groups, for example.

The silicon compound may be the hydrolysate of the silicon compound precursor as described above, and may be generated by hydrolyzing the silicon compound precursor represented by the chemical formula (2) described in the description as to the ultra-low refractive index layer of the present invention, for example.

$$(R^1)_{4-x}\text{—Si—}(OR^2)_x \quad (2)$$

The method of hydrolyzing the monomer compound precursor is not limited to particular methods, and can be performed by a chemical reaction in the presence of a catalyst, for example. Examples of the catalyst include acids such as an oxalic acid and an acetic acid. The hydrolysis reaction can be performed, for example, by gradually dropping an oxalic acid aqueous solution to a mixture (for example, suspension) of the silicon compound and dimethylsulfoxide to mix at room temperature, and stirring the resultant for about 30 minutes. In hydrolysis of the silicon compound precursor, for example, by completely hydrolyzing the alkoxy group of the silicon compound precursor, gelation and aging thereafter and heating and immobilization after formation of a void-provided structure can be achieved more efficiently.

The gelation of the monomer compound can be performed, for example, by a dehydration condensation reaction among the monomers. The dehydration condensation reaction is preferably performed in the presence of a catalyst, for example. Examples of the catalyst include dehydration condensation catalysts such as: acid catalysts including a hydrochloric acid, an oxalic acid, and a sulfuric acid; and base catalysts including ammonia, potassium hydroxide, sodium hydroxide, and ammonium hydroxide. The dehydration condensation catalyst is particularly preferably a base catalyst. In the dehydration condensation reaction, the amount of the catalyst to be added to the monomer compound is not limited to particular values, and is, for example, 0.1 to 10 mol, 0.05 to 7 mol, or 0.1 to 5 mol per mol of the monomer compound.

The gelation of the monomer compound is preferably performed in a solvent, for example. The proportion of the monomer compound in the solvent is not limited to particular values. Examples of the solvent include dimethylsulfoxide (DMSO), N-methylpyrrolidone (NMP), N,N-dimethylacetamide (DMAc), dimethylformamide (DMF), γ-butyrolactone (GBL), acetonitrile (MeCN), and ethylene glycol ethyl ether (EGEE). One of the solvents may be used alone or two or more of them may be used in combination, for example. Hereinafter, the solvent used for the gelation is also referred to as a "gelation solvent".

The condition for the gelation is not limited to particular conditions. Regarding the treatment of the solvent containing the monomer compound, the treatment temperature is, for example, 20° C. to 30° C., 22° C. to 28° C., or 24° C. to 26° C., and the treatment time is, for example, 1 to 60 minutes, 5 to 40 minutes, or 10 to 30 minutes. The treatment condition for the dehydration condensation reaction is not limited to particular conditions, and reference can be made to these examples. By gelation, a siloxane bond is grown and silica primary particles are formed. As the reaction further proceeds, the primary particles are connected in the form of a string of beads to generate a gel having a three-dimensional structure, for example.

The gelled compound obtained by the gelation is preferably subjected to aging treatment after the gelation reaction. The aging treatment causes further growth of the primary particle of a gel having a three-dimensional structure obtained by gelation, for example, and this allows the size of the particle itself to be increased. As a result, the contact state of the neck where particles are in contact with one another can be increased from a point contact to a surface contact. The gel which has been subjected to the aging treatment increases its strength, for example, and this increases the strength of the three-dimensional basic structure after pulverization. This prevents, in the drying step after coating of the pulverized product, the pore size of the void-provided structure obtained by deposition of the three-dimensional basic structures from shrinking in accordance with solvent volatilization during the drying process, for example.

The aging treatment can be performed, for example, by incubating the gelled compound at a predetermined temperature for a predetermined time. The predetermined temperature is not particularly limited, and the lower limit thereof is, for example, 30° C. or more, 35° C. or more, or 40° C. or more, the upper limit thereof is, for example, 80° C. or less, 75° C. or less, or 70° C. or less, and the predetermined temperature is, for example, in the range from 30° C. to 80° C., 35° C. to 75° C., or 40° C. to 70° C. The predetermined time is not particularly limited, and the lower limit is, for example, 5 hours or more, 10 hours or more, or 15 hours or more, the upper limit is, for example, 50 hours or less, 40 hours or less, or 30 hours or less, and the predetermined time is, for example, in the range from 5 hours to 50 hours, 10 hours to 40 hours, or 15 hours to 30 hours. An optimal condition for the aging is, for example, the condition mainly aiming for increase in the size of the silica primary particle and increase in the contact area of the neck. Furthermore, it is preferable to take the boiling point of a solvent to be used into consideration. For example, when the aging temperature is too high, there is a possibility that the solvent excessively volatilizes, which causes defectiveness such that the pore of the three-dimensional void-provided structure closes due to the condensation of the concentration of a coating liquid (gel liquid). On the other hand, for example, when the aging temperature is too low, there is a possibility not only that a sufficient effect of the aging is not brought about but also that temperature variations over time in a mass production process increase, which causes products with poor quality to be produced.

The same solvent as the solvent used in the gelation treatment can be used in the aging treatment, for example. Specifically, the aging treatment is preferably applied to a reactant (the solvent containing the gelled compound) after the gelation treatment. The mol number of residual silanol groups contained in the gel (the gelled compound, for example, the gelled silicon compound) after completion of the aging treatment after gelation is, for example, the proportion of the residual silanol group with the mol number of alkoxy groups of the added raw material (for example, the monomer compound precursor) being considered as 100, and the lower limit thereof is, for example, 50% or more, 40% or more, or 30% or more, the upper limit thereof is, for example, 1% or less, 3% or less, or 5% or less, and the mol number is, for example, in the range from 1% to 50%, 3% to 40%, or 5% to 30%. For the purpose of increasing the hardness of a gel, for example, the lower the mol number of the residual silanol groups, the better. When the mol number of the silanol groups is too high, for example, there is a possibility that the void-provided structure cannot be held until crosslinking is done in the precursors of the silicone porous body. On the other hand, when the mol number of the silanol groups is too low, for example, there is a possibility that the pulverized products of the gelled compound cannot be crosslinked in a step of preparing the liquid containing microporous particles (for example, suspension) and/or subsequent steps, which hinders a sufficient film strength from being imparted. Note that while the aforementioned description is described with reference to a silanol group as an example, the same phenomenon shall be applied to various functional groups in the case where a monomer silicon compound is modified with various reactive functional groups, for example.

After gelation of the monomer compound in the gelation solvent, the obtained gelled compound is pulverized. The gelled compound in the gelation solvent which has not been processed may be pulverized or the gelation solvent may be substituted with another solvent and the gelled compound in the substituted solvent may be pulverized, for example. Furthermore, if the catalyst and solvent used in the gelation reaction remain after the aging step, which causes gelation of the liquid over time (pot life) and decreases the drying efficiency in the drying step, it is preferable to substitute the gelation solvent with another solvent. Hereinafter, such a solvent for substitution may be also referred to as a "pulverization solvent".

The pulverization solvent is not limited to particular solvents, and can be, for example, an organic solvent. The organic solvent can be, for example, a solvent having a boiling point at 130° C. or less, 100° C. or less, or 85° C. or less. Specific examples of the organic solvent include isopropyl alcohol (IPA), ethanol, methanol, butanol, propylene glycol monomethyl ether (PGME), methyl cellosolve, acetone, and dimethylformamide (DMF). One of the pulverization solvents may be used alone or two or more of them may be used in combination.

The combination of the gelation solvent and the pulverization solvent is not limited to particular combinations, and the combination can be, for example, the combination of DMSO and IPA, the combination of DMSO and ethanol, the combination of DMSO and methanol, and the combination of DMSO and butanol. Substitution of the gelation solvent with the pulverization solvent makes it possible to form a coating film with uniform quality in the coating film formation described below, for example.

The method of pulverizing the gelled compound is not limited to particular methods. Examples of the apparatus for pulverizing include: pulverizing apparatuses utilizing a cavitation phenomenon such as an ultrasonic homogenizer and a high-speed rotating homogenizer; and pulverizing apparatuses of causing oblique collision of liquids at a high pressure. An apparatus such as a ball mill that performs media pulverization physically destroys the void-provided structure of a gel in pulverization, for example. On the other hand, a cavitation-type pulverizing apparatus such as a homogenizer, which is preferable in the present invention, peels the contact surface of silica particles, which are already contained in a gel three-dimensional structure and bonded relatively weakly, with a high speed shearing force owing to a medialess method, for example. Thus, a sol three-dimensional structure to be obtained can hold the void-provided structure having a particle size distribution of a certain range and can form the void-provided structure again by deposition in coating and drying, for example. The condition for the pulverization is not limited to particular conditions, and is preferably a condition that allows a gel to be pulverized without volatilizing a solvent by instantaneously imparting a high speed flow, for example. For example, it is preferable to pulverize the gelled silicon compound so as to obtain pulverized products having the above described particle size variations (for example, volume average particle size or particle size distribution). If the pulverization time, the pulverization strength, or the like is lacking, for example, there is a possibility not only that coarse particles remain, which hinders dense pores from being formed but also that defects in appearance increase, which hinders high quality from being achieved. On the other hand, if the pulverization time, the pulverization strength, or the like is too much, for example, there is a possibility that a finer sol particle than a desired particle size distribution is obtained and the size of a void space deposited after coating and drying is too fine to satisfy a desired porosity.

In the manner described above, a liquid (for example, suspension) containing the microporous particles can be prepared. By further adding a catalyst for chemically bonding the microporous particles after or during the preparation of the liquid containing the microporous particles, a liquid containing the microporous particles and the catalyst can be prepared. The amount of the catalyst to be added is not limited to particular values, and the amount of the catalyst to be added relative to the weight of the microporous particle (pulverized product of the gelled silicon compound) is, for example, in the range from 0.01 wt % to 20 wt %, 0.05 wt % to 10 wt %, or 0.1 wt % to 5 wt %. This catalyst chemically bonds the microporous particles in the bonding step described below, for example. The catalyst may be, for example, a catalyst that promotes the crosslinking bond among the microporous particles. As the chemical reaction of chemically bonding the microporous particles, it is preferable to utilize the dehydration condensation reaction of a residual silanol group contained in a silica sol molecule. By promoting the reaction between the hydroxyl groups of the silanol group by the catalyst, the continuous formation of a film in which the void-provided structure is cured in a short time can be performed. Examples of the catalyst include photoactive catalysts and thermoactive catalysts. The photoactive catalyst allows the chemical bond (for example, crosslinking bond) among the microporous particles without heating, for example. This makes it possible to maintain a higher proportion of void space because the shrinkage due to heating is less liable to occur, for example. In addition to or instead of the catalyst, a substance (catalyst generator) that generates a catalyst may be used. For example, the catalyst may be a crosslinking reaction accelerator and the catalyst generator may be a substance that generates the crosslinking reaction accelerator. For example, in addition to or instead of the photoactive catalyst, a substance (photocatalyst generator) that generates a catalyst by light irradiation may be used. For example, in addition to or instead of the thermoactive catalyst, a substance (thermal catalyst generator) that generates a catalyst by heating may be used. The photocatalyst generator is not limited to particular photocatalyst generators, and examples thereof include photobase generators (substances that generate basic catalysts by light irradiation) and photoacid generators (substances that generate acidic catalysts by light irradiation). Among them, the photobase generator is preferable. Examples of the photobase generator include 9-anthrylmethyl N,N-diethylcarbamate (product name: WPBG-018), (E)-1-[3-(2-hydroxyphenyl)-2-propenoyl]piperidine (product name: WPBG-027), 1-(anthraquinon-2-yl)ethyl imidazolecarboxylate (product name: WPBG-140), 2-nitrophenylmethyl 4-methacryloyloxypiperidine-1-carboxylate (product name: WPBG-165), 1,2-diisopropyl-3-[bis(dimethylamino) methylene]guanidium 2-(3-benzoylphenyl)propionate (product name: WPBG-266), 1,2-dicyclohexyl-4,4,5,5-tetramethylbiguanidium n-butyltriphenylborate (product name: WPBG-300), 2-(9-oxoxanthen-2-yl)propionic acid 1,5,7-triazabicyclo[4.4.0]dec-5-ene (Tokyo Kasei Kogyo Co., Ltd.), and a compound containing 4-piperidinemethanol (product of Heraeus, product name: HDPD-PB100). Note here that each product with the name including "WPBG" is a product of Wako Pure Chemical Industries, Ltd. Examples of the photoacid generator include aromatic sulfonium salt (product of ADEKA, product name: SP-170), triarylsulfonium salt (product of San-Apro Ltd., product name: CPI101A), and aromatic iodonium salt (product of Ciba Japan, product name: Irgacure 250). The catalyst for chemically bonding the microporous particles is not limited to the photoactive catalyst, and can be, for example, a thermoactive catalyst such as urea. Examples of the catalyst for chemically bonding the microporous particles include base catalysts such as potassium hydroxide, sodium hydroxide, and ammonium hydroxide; and acid catalysts such as a hydrochloric acid, an acetic acid, and an oxalic acid. Among them, the base catalyst is preferable. The catalyst for chemically bonding the microporous particles can be used by adding it to a sol particle liquid (for example, suspension) containing the pulverized products (microporous particles) right before the coating, or the catalyst can be used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents, and examples thereof include various organic solvents, water, and buffer solutions.

For example, in the case where the microporous particle is a pulverized product of a gelled silicon compound obtained from a silicon compound containing at least three or less functional groups having saturated bonds, a crosslinking assisting agent for indirectly bonding the microporous particles may further be added after or during preparation of a liquid containing the microporous particles. This crosslinking assisting agent penetrates among particles and interacts with or bonds to the particles, which helps to bond particles relatively distanced from one another and makes it possible to increase the strength efficiently. As the crosslinking assisting agent, a multicrosslinking silane monomer is preferable. Specifically, the multicrosslinking silane monomer may have at least two and at most three alkoxysilyl groups, the chain length between the alkoxysilyl groups may be 1-10C, and the multicrosslinking silane monomer may contain an element other than carbon, for example. Examples of the crosslinking assisting agent include bis(trimethoxysilyl)ethane, bis(triethoxysilyl)ethane, bis(trimethoxysilyl)methane, bis(triethoxysilyl)methane, bis(triethoxysilyl)propane, bis(trimethoxysilyl)propane, bis(triethoxysilyl)butane, bis(trimethoxysilyl)butane, bis(triethoxysilyl)pentane, bis(trimethoxysilyl)pentane, bis(triethoxysilyl)hexane, bis(trimethoxysilyl)hexane, bis(trimethoxysilyl)-N-butyl-N-propyl-ethane-1,2-diamine, tris-(3-trimethoxysilylpropyl)isocyanurate, and tris-(3-triethoxysilylpropyl)isocyanurate. The amount of the crosslinking assisting agent to be added is not limited to particular values, and the amount of the crosslinking assisting agent to be added relative to the weight of the silicon compound microporous particle is, for example, in the range from 0.01 wt % to 20 wt %, 0.05 wt % to 15 wt %, or 0.1 wt % to 10 wt %.

The production method of the present invention includes a step of coating a resin film with the liquid containing the microporous particles (for example, suspension) as described above. The coating can be performed, for example, by the various coating methods described below but not limited thereto. By directly coating the base with the solvent containing the pulverized products, the precursor of the porous body (coating film) can be formed. The precursor of the porous body can also be referred to as a coating layer, for example. The precursor of the porous body, which is the precursor of the porous body before the bonding step described below, can be also referred to as a precursor film (or precursor layer) of the ultra-low refractive index layer of the present invention, for example. Formation of the precursor (coating film) of the porous body causes the settlement and deposition of the pulverized product whose three-dimensional structure has been destroyed, for example, and this allows a new three-dimensional structure to be formed.

The solvent (hereinafter, also referred to as a "coating solvent") is not limited to particular solvents, and can be, for example, an organic solvent. The organic solvent can be, for example, a solvent having a boiling point at 130° C. or less. Specific examples of the solvent include IPA, ethanol, methanol, and butanol, and the examples of the pulverization solvent described above can be used. In the case where the present invention includes a step of pulverizing the gelled compound, for example, the pulverization solvent containing the pulverized products of the gelled compound can be used without processing in the step of forming the precursor of the porous body.

In the coating step, for example, it is preferable to coat the base with the sol pulverized products dispersed in the solvent (hereinafter, also referred to as a "sol particle liquid"). After coating the base with the sol particle liquid of the present invention and drying it, by chemically crosslinking the particles in the bonding step, the continuous formation of a void-provided layer having a film strength of a certain level or more can be performed. The "sol" in the present invention denotes a fluidic state in which silica sol particles each having a nano three-dimensional structure holding a part of the void-provided structure are dispersed in a solvent by pulverization of the three-dimensional structure of a gel.

The concentration of the pulverized product in the solvent is not limited to particular values, and is, for example, in the range from 0.3% to 50% (v/v), 0.5% to 30% (v/v), or 1.0% to 10% (v/v). When the concentration of the pulverized product is too high, there is a possibility that the fluidity of the sol particle liquid decreases significantly, which causes aggregates and coating stripes in coating, for example. On the other hand, when the concentration of the pulverized product is too low, there is a possibility not only that the drying of the sol particle solvent takes a relatively long time but also that the residual solvent right after the drying increases, which may decrease the porosity, for example.

There is no particular limitation on the physical property of the sol. The shear viscosity of the sol is, for example, 100 cPa·s or less, 10 cPa·s or less, or 1 cPa·s or less, for example, at the shear rate of 1000l/s. When the shear viscosity is too high, for example, there is a possibility that the coating stripes are generated, which causes defectiveness such as decrease in the transfer rate in the gravure coating. In contrast, when the shear viscosity is too low, for example, there is a possibility that the thickness of the wet coating during coating cannot be increased and a desired thickness cannot be obtained after drying.

The coating amount of the pulverized product relative to the base is not limited to particular values, and can be determined appropriately, for example, according to the thickness of a desired silicone porous body. As a specific example, in the case of forming the silicone porous body having a thickness of 0.1 to 1000 μm, the coating amount of the pulverized product relative to the base is, for example, in the range from 0.01 to 60000 μg, 0.1 to 5000 μg, or 1 to 50 μg per square meter of the base. Although it is difficult to uniquely define a preferable coating amount of the sol particle liquid because it depends on the concentration of a liquid, the coating method, or the like, for example, it is preferable that a coating layer is as thin as possible in consideration of productivity. When the coating amount is too much, for example, there is a high possibility that a solvent is dried in a drying oven before volatilizing. When the solvent is dried before forming the void-provided structure by the settlement and deposition of the nano pulverized sol particles in the solvent, there is a possibility that formation of void spaces is inhibited and the proportion of void space decreases. On the other hand, when the coating amount is too little, there is a possibility of increasing the risk of causing coating cissing due to unevenness of a base, variations in hydrophilicity and hydrophobicity, and the like.

Furthermore, the production method of the present invention includes a step of drying the liquid containing the microporous particles (precursor of porous body (coating film)) as described above. The drying treatment is aimed not only for removing the solvent (solvent contained in the sol particle liquid) from the precursor of the porous body but also for causing the settlement and deposition of the sol particles to form a void-provided structure in the drying treatment, for example. The temperature for the drying treatment is, for example, in the range from 50° C. to 250° C., 60° C. to 150° C., or 70° C. to 130° C., and the time for the drying treatment is, for example, in the range from 0.1 to 30 minutes, 0.2 to 10 minutes, or 0.3 to 3 minutes. Regarding the temperature and time for the drying treatment in relation to continuous productivity and high porosity expression, the lower the better and the shorter the better, for example. When the condition is too strict, there is a possibility of causing the following problems, for example. That is, when the base is a resin film, for example, the base extends in a drying oven as the temperature approaches the glass-transition temperature of the base, which causes defects such as cracks in a formed void-provided structure right after coating. On the other hand, when the condition is too mild, there is a possibility of causing the following problems, for example. That is, since the film contains a residual solvent when it comes out of the drying oven, defects in appearance such as scratches are caused when the film rubs against a roller in the next step.

The drying treatment may be, for example, natural drying, drying by heating, or drying under reduced pressure. The drying method is not limited to particular methods, and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto.

The drying treatment may be, for example, natural drying, drying by heating, or drying under reduced pressure. The drying method is not limited to particular methods, and a common heating unit can be used, for example. Examples of the heating unit include a hot air fan, a heating roll, and a far-infrared heater. Among them, in view of performing continuous production industrially, drying by heating is preferable. The solvent to be used is preferably a solvent having a low surface tension in view of reducing the shrinkage stress in accordance with the solvent volatilization in drying and reducing the crack phenomenon of the void-provided layer (the silicone porous body) due to the shrinkage stress. The solvent can be, for example, lower alcohol typified by isopropyl alcohol (IPA), hexane, perfluorohexane, and the like. The solvent, however, is not limited thereto. The surface tension may be reduced by adding a small amount of a perfluoro surfactant or a small amount of a silicon surfactant to the IPA and the like.

According to the production method of the present invention, the three-dimensional structure of the pulverized product in the precursor of the porous body is immobilized, for example. In the case of immobilizing the three-dimensional structure by conventional sintering, for example, the dehydration condensation of a silanol group and the formation of a siloxane bond are induced by high temperature treatment at 200° C. or more. In the present invention, for example, when a base is a resin film, the void-provided structure can be formed and immobilized continuously at about 100° C. which is relatively low for less than several minutes which is short without damaging the base by causing various additives, which catalyze the dehydration condensation reaction, to react.

The method of chemically bonding the particles is not limited to particular methods, and can be determined appropriately according to the type of the gelled silicon compound, for example. Specifically, for example, the chemical bond can be a chemical crosslinking bond among the pulverized products. Besides this, for example, when inorganic particles such as titanium oxide particles are added to the pulverized products, the inorganic particles and the pulverized products can be chemically bonded by crosslinking. Furthermore, there are a case of using a biocatalyst such as an enzyme and a case of chemically crosslinking the pulverized product and a catalyst at a site which is different from a catalytic activity site. Thus, the present invention can be applied not only to a void-provided layer (silicone porous body) formed of the sol particles but also to an organic-inorganic hybrid void-provided layer, a host-guest void-provided layer, and the like, for example. The present invention, however, is not limited thereto.

The bonding can be carried out by a chemical reaction of chemically bonding the pulverized products (microporous particles) in the presence of a catalyst according to the type of the pulverized product of the gelled compound, for example. The catalyst may be a catalyst for promoting the crosslinking bond among microporous particles, for example. The chemical reaction in the present invention is preferably a reaction utilizing a dehydration condensation reaction of a residual silanol group contained in a silica sol molecule. By promoting the reaction between the hydroxyl groups of the silanol group by the catalyst, the continuous formation of a film in which the void-provided structure is cured in a short time can be performed. Examples of the catalyst include: base catalysts such as potassium hydroxide, sodium hydroxide, and ammonium hydroxide; and acid catalysts such as a hydrochloric acid, an acetic acid, and an oxalic acid. The catalyst, however, is not limited thereto. The catalyst used in the dehydration condensation reaction is preferably a base catalyst. Furthermore, photoacid generation catalysts, photobase generation catalysts, photoacid generators, photobase generators, and the like, each of which expresses a catalytic activity by light (for example, ultraviolet) irradiation, may preferably be used. The photoacid generation catalysts, photobase generation catalysts, photoacid generators, and photobase generators are not limited to particular catalysts, and can be, for example, as described above. The catalyst can be added to the liquid containing the microporous particles (for example, suspension of the pulverized products (microporous particles)), for example, in the step of preparing the liquid as described above. More specifically, the catalyst is used by adding it to a sol particle liquid (for example, suspension) containing the pulverized products (microporous particles) right before the coating or the catalyst is used as a mixture by mixing it with a solvent, for example. The mixture may be, for example, a coating liquid obtained by adding the catalyst directly to the sol particle liquid, a solution obtained by dissolving the catalyst in a solvent, or a dispersion liquid obtained by dispersing the catalyst into a solvent. The solvent is not limited to particular solvents as described above, and examples thereof include water, and buffer solutions.

It is not particularly limited at which stage the chemical reaction in the presence of the catalyst is performed (caused) in the production method of the present invention. The chemical reaction can be performed, for example, by heating the coating film containing the catalyst preliminarily added to the sol particle liquid (for example, suspension) or irradiating the coating film containing the catalyst preliminarily added to the sol particle liquid with light, by heating the coating film or irradiating the coating film with light after the catalyst has been sprayed to the coating film, or by heating the coating film or irradiating the coating film with light while spraying the catalyst to the coating film. For example, when the catalyst is a photoactive catalyst, the ultra-low refractive index layer can be formed by chemically bonding the microporous particles by light irradiation. When the catalyst is a thermoactive catalyst, the ultra-low refractive index layer can be formed by chemically bonding the microporous particles by heating. The accumulated light amount in the light irradiation is not limited to particular values, and is, for example, in the range from 200 to 800 $mJ/cm^2$, 250 to 600 $mJ/cm^2$, or 300 to 400 $mJ/cm^2$ in terms of the wave length at 360 nm. From the view point of preventing the effect from being insufficient due to the delay of decomposition of the catalyst generator by light absorption because of insufficient irradiation amount, the accumulated light amount is preferably 200 $mJ/cm^2$ or more. From the view point of preventing heat wrinkles from generating due to the damage on a base below a void-provided layer, the accumulated light amount is preferably 800 $mJ/cm^2$ or less. The conditions for the heat treatment are not limited to particular conditions. The heating temperature is, for example, 50° C. to 250° C., 60° C. to 150° C., or 70° C. to 130° C., the heating time is, for example, 0.1 to 30 minutes, 0.2 to 10 minutes, or 0.3 to 3 minutes. The step of drying the sol particle liquid (for example, suspension) may also serve as a step of performing a chemical reaction in the presence of the catalyst. That is, in the step of drying the sol particle liquid (for example, suspension), the pulverized products (microporous particles) may be chemically bonded in the presence of the catalyst. In this case, by further heating the coating film after the drying step, the pulverized products (microporous particles) may be bonded more firmly. It is presumed that the chemical reaction in the presence of the catalyst may be caused also in the step of preparing the liquid (for example, suspension) containing the microporous particles and the step of coating the resin film with the liquid containing microporous particles. This presumption, however, does not limit the present invention by any means. The solvent to be used is preferably a solvent having a low surface tension in view of reducing the shrinkage stress in accordance with the solvent volatilization in drying and reducing the crack phenomenon of the void-provided layer due to the shrinkage stress, for example. The solvent can be, for example, lower alcohol typified by isopropyl alcohol (IPA), hexane, perfluorohexane, or the like. The solvent, however, is not limited thereto.

In the manner described above, the ultra-low refractive index layer (laminated film roll) of the present invention can be produced. The production method of the present invention, however, is not limited thereto.

The thus obtained ultra-low refractive index layer (laminated film roll) of the present invention may be subjected to a strength increasing step (hereinafter, also referred to as an "aging step") of applying thermal aging to increase the strength, for example. For example, when the ultra-low refractive index layer of the present invention is stacked on a resin film, the peel strength to the resin film can be increased by the strength increasing step (aging step). In the strength increasing step (aging step), for example, the ultra-low refractive index layer of the present invention may be heated. The temperature of the aging step is, for example, 40° C. to 80° C., 50° C. to 70° C., or 55° C. to 65° C. The time for the reaction is, for example, 5 to 30 hours, 7 to 25 hours, or 10 to 20 hours. By setting the heating temperature low in the aging step, for example, the peel strength can be increased while reducing the shrinkage of the ultra-low refractive index layer, thereby achieving both a high proportion of void space and strength.

While the phenomenon and mechanism caused in the strength increasing step (aging step) are unknown, for example, it is considered that the catalyst contained in the ultra-low refractive index layer of the present invention promotes the chemical bond (for example, crosslinking reaction) among the microporous particles, thereby increasing the strength. As a specific example, when the microporous particles are silicon compound microporous particles (for example, pulverized products of a gelled silica compound) and residual silanol groups (OH groups) are present in the ultra-low refractive index layer, it is considered that the residual silanol groups are chemically bonded by a crosslinking reaction. The catalyst contained in the ultra-low refractive index layer of the present invention is not limited to particular catalysts, and can be, for example, a catalyst used in the bonding step, a basic substance generated by the photobase generation catalyst used in the bonding step by light irradiation, or an acidic substance generated by the photoacid generation catalyst used in the bonding step by light irradiation. The description, however, is illustrative and does not limit the present invention.

A pressure-sensitive adhesive/adhesive layer may additionally be formed on the ultra-low refractive index layer of the present invention (pressure-sensitive adhesive/adhesive layer forming step). Specifically, for example, the pressure-sensitive adhesive/adhesive layer may be formed by applying a pressure-sensitive adhesive or an adhesive to the ultra-low refractive index layer of the present invention. The pressure-sensitive adhesive/adhesive layer may be formed on the ultra-low refractive index layer of the present invention using an adhesive tape in which the pressure-sensitive adhesive/adhesive layer is formed on a base by adhering the pressure-sensitive adhesive/adhesive layer side of the adhesive tape on the ultra-low refractive index layer of the present invention. In this case, the base of the adhesive tape may be kept adhered or peeled from the pressure-sensitive adhesive/adhesive layer. In the present invention, a "pressure-sensitive adhesive" and a "pressure-sensitive adhesive layer" are used based on the premise that an adherend is re-peelable, for example. In the present invention, an "adhesive" and an "adhesive layer" are used based on the premise that an adherend is not re-peelable, for example. In the present invention, however, the "pressure-sensitive adhesive" and the "adhesive" are not always distinguishable and the "pressure-sensitive adhesive layer" and the "adhesive layer" are not always distinguishable. In the present invention, there is no particular limitation on the pressure-sensitive adhesives or the adhesives for forming the pressure-sensitive adhesive/adhesive layer, and a common pressure-sensitive adhesive or adhesive can be used, for example. Examples of the pressure-sensitive adhesive and the adhesive include polymer adhesives such as acrylic adhesives, vinyl alcohol adhesives, silicone adhesives, polyester adhesives, polyurethane adhesives, and polyether adhesives; and rubber adhesives. Furthermore, the pressure-sensitive adhesive and the adhesive can be an adhesive including a water-soluble crosslinking agent of vinyl alcohol polymer such as glutaraldehyde, melamine, or an oxalic acid. One type of the pressure-sensitive adhesives and adhesives may be used alone or two or more types of them may be used in combination (for example, mixing, lamination, and the like). The thickness of the pressure-sensitive adhesive/adhesive layer is not limited to particular values, and is, for example, 0.1 to 100 μm, 5 to 50 μm, 10 to 30 μm, or 12 to 25 μm.

Furthermore, an intermediate layer may be formed between the ultra-low refractive index layer of the present invention and the pressure-sensitive adhesive/adhesive layer by causing the ultra-low refractive index layer of the present invention to react with the pressure-sensitive adhesive/adhesive layer (intermediate layer forming step). Owing to the intermediate layer, the ultra-low refractive index layer of the present invention and the pressure-sensitive adhesive/adhesive layer are not easily peeled from each other, for example. While the reason (mechanism) for this is unknown, it is presumed that the ultra-low refractive index layer of the present invention and the pressure-sensitive adhesive/adhesive layer are not easily peeled from each other owing to the anchoring property (anchor effect) of the intermediate layer, for example. The anchoring property (anchor effect) is a phenomenon (effect) that the interface between the void-provided layer and the intermediate layer is strongly fixed because the intermediate layer is entangled in the void-provided layer in the vicinity of the interface. This reason (mechanism), however, is an example of a presumable reason (mechanism), and does not limit the present invention. The reaction between the ultra-low refractive index layer of the present invention and the pressure-sensitive adhesive/adhesive layer is not limited to particular reactions, and can be, for example, a reaction by catalysis. The catalyst may be a catalyst contained in the ultra-low refractive index layer of the present invention, for example. Specifically, the catalyst can be, for example, a catalyst used in the bonding step, a basic substance generated by the photobase generation catalyst used in the bonding step by light irradiation, or an acidic substance generated by the photoacid generation catalyst used in the bonding step by light irradiation. The reaction between the ultra-low refractive index layer of the present invention and the pressure-sensitive adhesive/adhesive layer may be, for example, a reaction (for example, crosslinking reaction) that generates a new chemical bond. The temperature of the reaction is, for example, 40° C. to 80° C., 50° C. to 70° C., or 55° C. to 65° C. The time for the reaction is, for example, 5 to 30 hours, 7 to 25 hours, or 10 to 20 hours. This intermediate layer forming step may also serve as the strength increasing step (aging step) of increasing the strength of the ultra-low refractive index layer of the present invention.

The thus obtained ultra-low refractive index layer of the present invention may further be stacked on another film (layer) to form a laminate having the porous structure, for example. In this case, the components of the laminate may be stacked through a pressure-sensitive adhesive or an adhesive, for example.

The components may be laminated by continuous treatment (so called Roll to Roll) using a long film, for example, in terms of efficiency. When the base is a molded product, an element, or the like, the base that has been subjected to a batch process may be laminated.

The method of forming an ultra-low refractive index layer of the present invention on a base is described below with reference to a continuous treatment process using FIGS. 1 to 3 as an example. FIG. 2 shows a step of adhering a protective film to a formed silicone porous body (ultra-low refractive index layer) and winding the laminate. In the case of forming the silicone porous body on another functional film, the aforementioned method may be adopted or the formed silicone porous body (ultra-low refractive index layer) may be adhered to another functional film that has been coated and dried, right before winding. The method of forming a film shown in FIG. 2 is an example, and the present invention is not limited thereto.

The base may be the resin film described in the description as to the ultra-low refractive index layer of the present invention. In this case, the ultra-low refractive index layer of the present invention can be obtained by forming the ultra-low refractive index layer on the base. The ultra-low refractive index layer of the present invention can be obtained also by forming the ultra-low refractive index layer on the base and then stacking the ultra-low refractive index layer on the resin film described in the description as to the ultra-low refractive index layer of the present invention.

Figure 2:
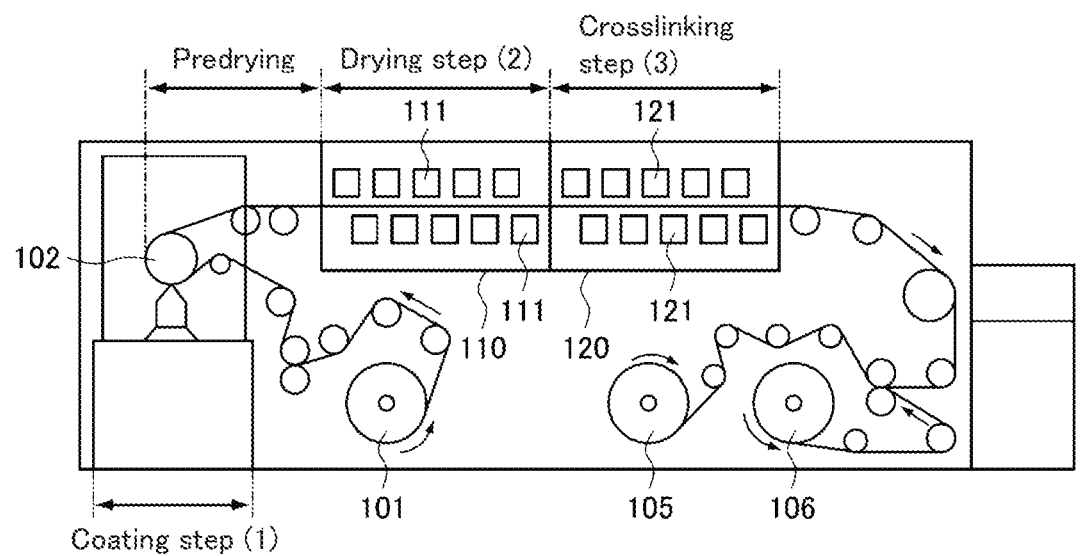
FIG. 2 is an illustration schematically showing an example of a part of the process of producing a laminated film roll of the present invention and an example of the apparatus used therefor.

FIG. 1 is a cross sectional view schematically showing an example of the process of forming the ultra-low refractive index layer on the base. In FIG. 1, the method of forming an ultra-low refractive index layer includes: (1) a coating step of coating a base 10 with a sol particle liquid 20" containing pulverized products of a gelled compound; (2) a coating film forming step (drying step) of drying the sol particle liquid 20" to form a coating film 20' which is the precursor layer of the ultra-low refractive index layer; and (3) a chemical treatment step (for example, a crosslinking treatment step) of applying chemical treatment (for example, crosslinking treatment) to the coating film 20' to form an ultra-low refractive index layer 20. In this manner, as shown in FIG. 1, the ultra-low refractive index layer 20 can be formed on the base 10. The method of forming an ultra-low refractive index layer may include steps other than the steps (1) to (3) appropriately.

In the coating step (1), the method of coating the base with the sol particle liquid 20" is not limited to particular methods, and a common method can be adopted. Examples of the method include a slot die method, a reverse gravure coating method, a micro-gravure method (micro-gravure coating method), a dip method (dip coating method), a spin coating method, a brush coating method, a roller coating method, a flexography, a wire-bar coating method, a spray coating method, an extrusion coating method, a curtain coating method, and a reverse coating method. Among them, from the viewpoint of productivity, smoothness of a coating film, and the like, an extrusion coating method, a curtain coating method, a roller coating method, a micro-gravure coating method, and the like are preferable. The coating amount of the sol particle liquid 20″ is not limited to particular values, and can be determined appropriately so as to obtain an ultra-low refractive index layer 20 having an appropriate thickness, for example. The thickness of the ultra-low refractive index layer 20 is not limited to particular values, and is, for example, as described above.

In the (2) drying step, the sol particle liquid 20″ is dried (i.e., dispersion medium contained in sol particle liquid 20″ is removed) to form a coating film (precursor layer) 20'. There is no particular limitation on the condition for the drying treatment, and is as described above.

In the (3) chemical treatment step, the coating film 20' containing the catalyst (for example, photoactive catalyst or thermoactive catalyst such as KOH) which has been added before coating is irradiated with light or heated to chemically bond (for example, crosslink) the pulverized products in the coating film 20', thereby forming an ultra-low refractive index layer 20. The conditions for the light irradiation and heating in the (3) chemical treatment step are not limited to particular conditions, and are as described above. By using the resin film as the base 10, the ultra-low refractive index layer 20 can be stacked directly on the resin film (base 10), for example.

FIG. 2 schematically shows an example of a slot die coating apparatus and an example of the method of forming an ultra-low refractive index layer using the same. Although FIG. 2 is a cross sectional view, hatching is omitted for viewability.

As shown in FIG. 2, the steps of the method using this apparatus are carried out while carrying a base 10 in one direction by rollers. The carrying speed is not limited to particular values, and is, for example, in the range from 1 to 100 m/min, 3 to 50 m/min, or 5 to 30 m/min.

First, the base 10 is delivered from a delivery roller 101 and carried to a coating roller 102, and the (1) coating step of coating the base 10 with a sol particle liquid 20″ is carried out using the coating roller 102. Subsequently, the (2) drying step is carried out in an oven zone 110. In the coating apparatus shown in FIG. 2, a predrying step is carried out after the (1) coating step and before the (2) drying step. The predrying step can be carried out at room temperature without heating. In the (2) drying step, a heating unit 111 is used. As the heating unit 111, as described above, a hot air fan, a heating roll, a far-infrared heater, or the like can be used appropriately. For example, the (2) drying step may be divided into multiple steps, and the drying temperature may be set higher as coming to later steps.

The (3) chemical treatment step is carried out in a chemical treatment zone 120 after the (2) drying step. In the (3) chemical treatment step, for example, when the coating film 20' after drying contains a photoactive catalyst, light is emitted from lamps (light irradiation units) 121 disposed above and below the base 10. On the other hand, for example, when the coating film 20' after drying contains a thermoactive catalyst, the base 10 is heated using hot air fans 121 disposed above and below the base 10 instead of using the lamps (light irradiation devices) 121. By this crosslinking treatment, the pulverized products in the coating film 20' are chemically bonded, and the ultra-low refractive index layer 20 is cured and strengthened. Note that, although the (3) chemical treatment step is performed after the (2) drying step in the present example, as described above, there is no particular limitation at which stage in the production method of the present invention the chemical bond among the pulverized products is caused. For example, as described above, the (2) drying step may also serve as the (3) chemical treatment step. Even when the chemical bond is caused in the (2) drying step, the (3) chemical treatment step may be performed to make the chemical bond among the pulverized products firmer.

Furthermore, in the steps (for example, predrying step, the (1) coating step, step of preparing a coating liquid (for example, suspension), and the like) before the (2) drying step, the chemical bond among the pulverized products may be caused. After the (3) chemical treatment step, a laminate in which the ultra-low refractive index layer 20 is formed on the base 10 is wound by a winding roller 105. By using the resin film as the base 10, for example, the ultra-low refractive index layer 20 may be directly formed on the resin film (base 10). In FIG. 2, the ultra-low refractive index layer 20, which is a laminate, is protected by coating with a protecting sheet delivered from a roller 106. Instead of the protecting sheet, another layer formed of a long film may be formed on the ultra-low refractive index layer 20.

Figure 3:
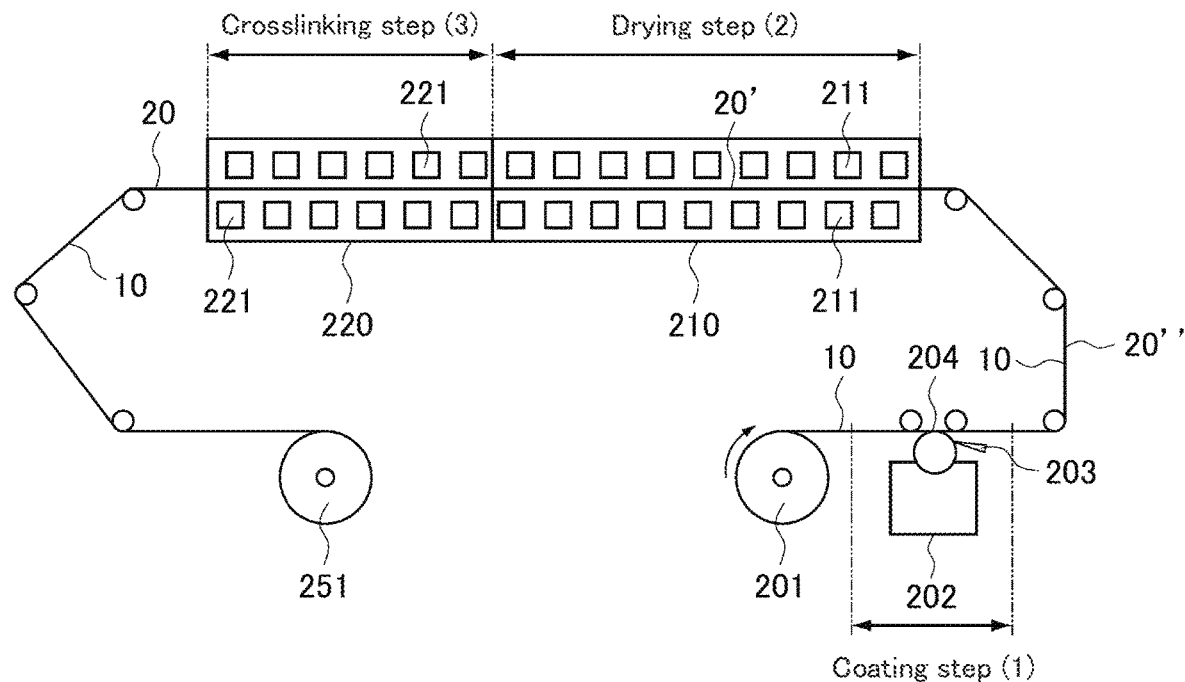
FIG. 3 is an illustration schematically showing another example of a part of the process of producing a laminated film roll of the present invention and another example of the apparatus used therefor.

FIG. 3 schematically shows an example of a micro-gravure coating apparatus and an example of the method of forming an ultra-low refractive index layer using the same. Although FIG. 3 is a cross sectional view, hatching is omitted for viewability.

As shown in FIG. 3, the steps of the method using this apparatus are carried out while carrying the base 10 in one direction by rollers as in FIG. 2. The carrying speed is not limited to particular values, and is, for example, in the range from 1 to 100 m/min, 3 to 50 m/min, or 5 to 30 m/min.

First, the (1) coating step of coating the base 10 with a sol particle liquid 20″ is carried out while carrying the base 10 delivered from a delivery roller 201. As shown in FIG. 3, the coating with the sol particle liquid 20″ is performed using a liquid reservoir 202, a doctor (doctor knife) 203, and a micro-gravure 204. Specifically, the sol particle liquid 20' in the liquid reservoir 202 is applied to the surface of the micro-gravure 204 and the coating of the surface of the base 10 is performed using the micro-gravure 204 while controlling the thickness to a predetermined thickness using a doctor 203. The micro-gravure 204 is merely illustrative. The present invention is not limited thereto, and any other coating unit may be adopted.

Subsequently, the (2) drying step is performed. Specifically, as shown in FIG. 3, the base 10 coated with the sol particle liquid 20″ is carried into an oven zone 210 and the sol particle liquid 20″ is dried by heating using heating units 211 disposed in the oven zone 210. The heating units 211 can be, for example, the same as those shown in FIG. 2. For example, the (2) drying step may be divided into multiple steps by dividing the oven zone 210 into multiple sections, and the drying temperature may be set higher as coming to later steps. The (3) chemical treatment step is carried out in a chemical treatment zone 220 after the (2) drying step. In the (3) chemical treatment step, for example, when the coating film 20' after drying contains a photoactive catalyst, light is emitted from lamps (light irradiation units) 221 disposed above and below the base 10. On the other hand, for example, when the coating film 20' after drying contains a thermoactive catalyst, the base 10 is heated using hot air fans (heating units) 221 disposed below the base 10 instead of using lamps (light irradiation devices) 221. By this crosslinking treatment, the pulverized products in the coating film 20' are chemically bonded, and the ultra-low refractive index layer 20 is formed.

After the (3) chemical treatment step, a laminate in which the porous structure 20 is formed on the base 10 is wound by a winding roller 251. By using the resin film as the base 10, the ultra-low refractive index layer 20 can be stacked directly on the resin film (base 10), for example. Thereafter, for example, another layer may be formed on the laminate. Furthermore, another layer may be stacked on the laminate before winding the laminate by the winding roller 251, for example.

Figure 4:
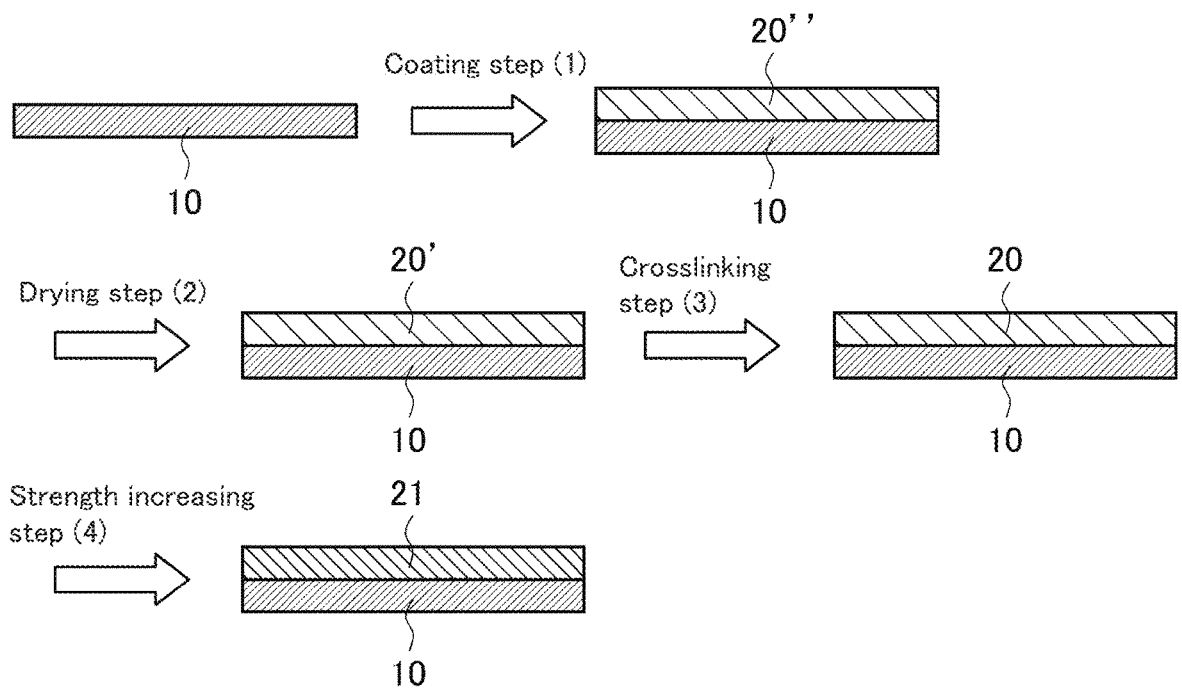
FIG. 4 is a process cross sectional view schematically showing another example of the method of forming an ultra-low refractive index layer on a base in the present invention.
Figure 5:
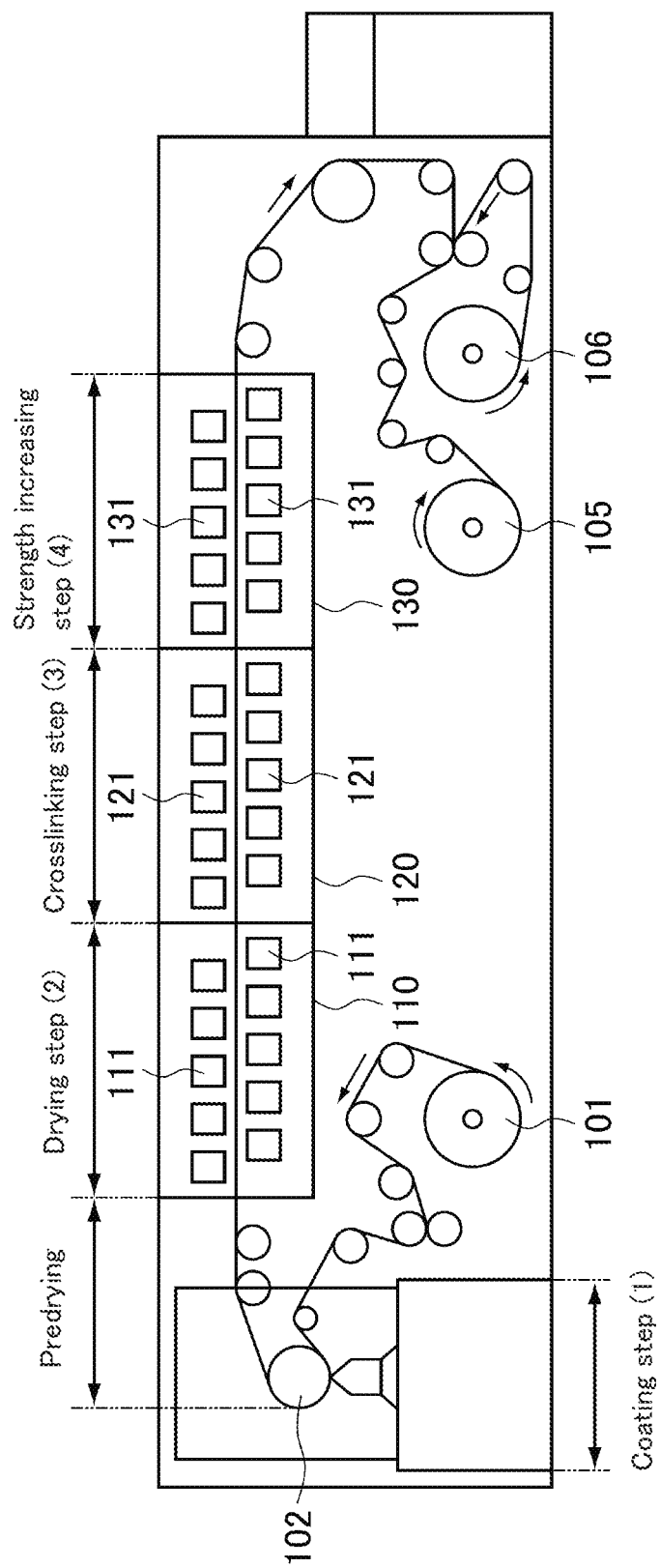
FIG. 5 is an illustration schematically showing still another example of a part of the process of producing an ultra-low refractive index layer of the present invention and still another example of the apparatus used therefor.
Figure 6:
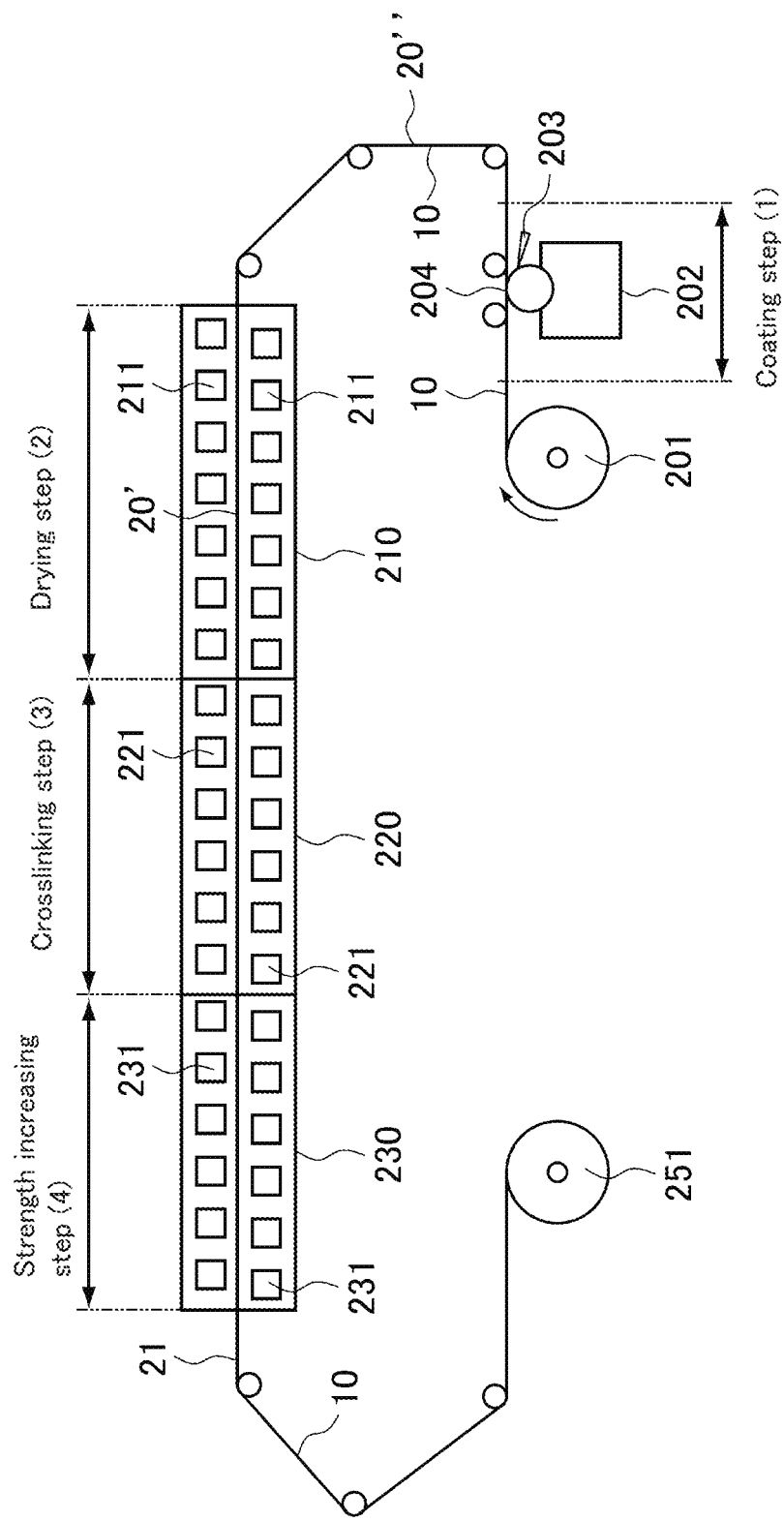
FIG. 6 is an illustration schematically showing still another example of a part of the process of producing an ultra-low refractive index layer of the present invention and still another example of the apparatus used therefor.

FIGS. 4 to 6 show another example of a continuous treatment process of forming an ultra-low refractive index layer of the present invention. As shown in the cross sectional view of FIG. 4, this method is the same as the method shown in FIGS. 1 to 3 except that (4) strength increasing step (aging step) is carried out after the (3) chemical treatment step (for example, crosslinking treatment step) of forming an ultra-low refractive index layer 20. As shown in FIG. 4, the strength of the ultra-low refractive index layer 20 is increased in the (4) strength increasing step (aging step), thereby forming an ultra-low refractive index layer 21 with a greater strength. There is no particular limitation on the (4) strength increasing step (aging step), and can be, for example, as described above.

FIG. 5 is a schematic view showing an example of a slot die coating apparatus and an example of the method of forming an ultra-low refractive index layer using the same, which are different from those shown in FIG. 2. As can be seen, the coating apparatus shown in FIG. 5 is the same as the apparatus shown in FIG. 2 except that the apparatus shown in FIG. 5 includes a strength increasing zone (aging zone) 130 where the (4) strength increasing step (aging step) is carried out right next to the chemical treatment zone 120 where the (3) chemical treatment step is carried out. That is, after the (3) chemical treatment step, the (4) strength increasing step (aging step) is carried out in the strength increasing zone (aging zone) 130 to increase the peel strength of the ultra-low refractive index layer 20 relative to a resin film 10, thereby forming an ultra-low refractive index layer 21 having a higher peel strength. The (4) strength increasing step (aging step) may be carried out by heating the ultra-low refractive index layer 20 in the same manner as described above using hot air fans (heating units) 131 disposed above and below the base 10, for example. The conditions including the heating temperature, the time, and the like are not limited to particular values, and can be, for example, as described above. After the (4) strength increasing step, similar to the process shown in FIG. 3, a laminated film in which the ultra-low refractive index layer 21 is formed on the base 10 is wound by a winding roller 105.

FIG. 6 is a schematic view showing an example of a micro-gravure coating apparatus and an example of the method of forming a porous structure using the same, which are different from those shown in FIG. 3. As can be seen, the coating apparatus shown in FIG. 6 is the same as the apparatus shown in FIG. 3 except that the apparatus shown in FIG. 6 includes a strength increasing zone (aging zone) 230 where the (4) strength increasing step (aging step) is carried out right next to the chemical treatment zone 220 where the (3) chemical treatment step is carried out. That is, after the (3) chemical treatment step, the (4) strength increasing step (aging step) is carried out in the strength increasing zone (aging zone) 230 to increase the peel strength of the ultra-low refractive index layer 20 relative to a resin film 10, thereby forming an ultra-low refractive index layer 21 having a higher peel strength. The (4) strength increasing step (aging step) may be carried out by heating the ultra-low refractive index layer 20 in the same manner as described above using hot air fans (heating units) 231 disposed above and below the base 10, for example. The conditions including the heating temperature, the time, and the like are not limited to particular values, and can be, for example, as described above. After the (4) strength increasing step, similar to the process shown in FIG. 3, a laminated film in which the ultra-low refractive index layer 21 is formed on the base 10 is wound by a winding roller 251.

Figure 7:
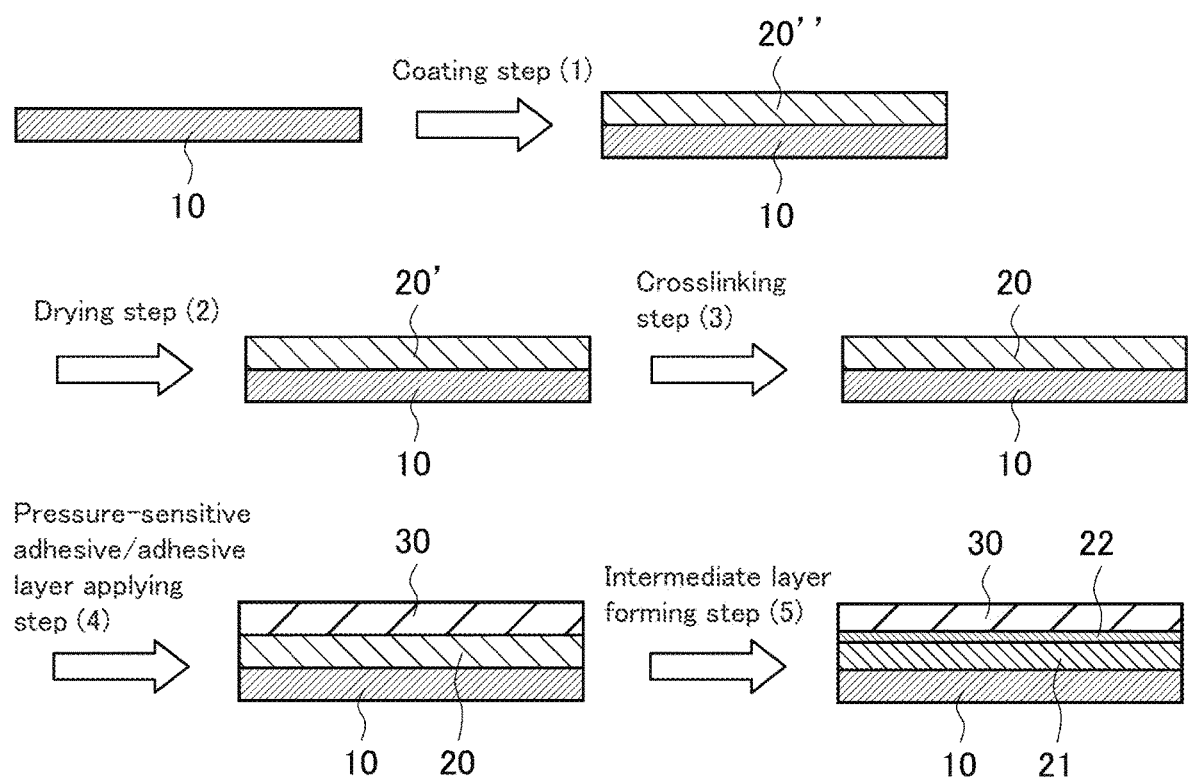
FIG. 7 is a process cross sectional view schematically showing still another example of the method of forming an ultra-low refractive index layer on a base in the present invention.
Figure 8:
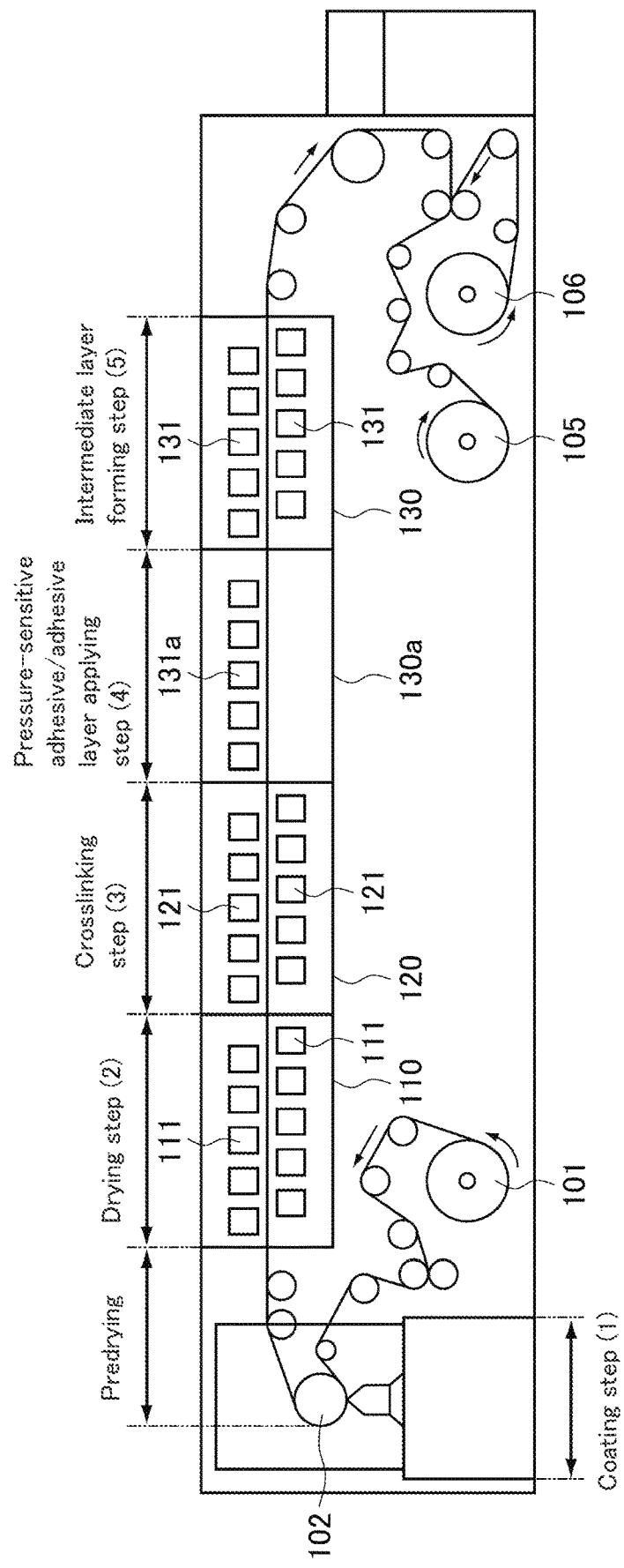
FIG. 8 is an illustration schematically showing still another example of a part of the process of producing an ultra-low refractive index layer of the present invention and still another example of the apparatus used therefor.
Figure 9:
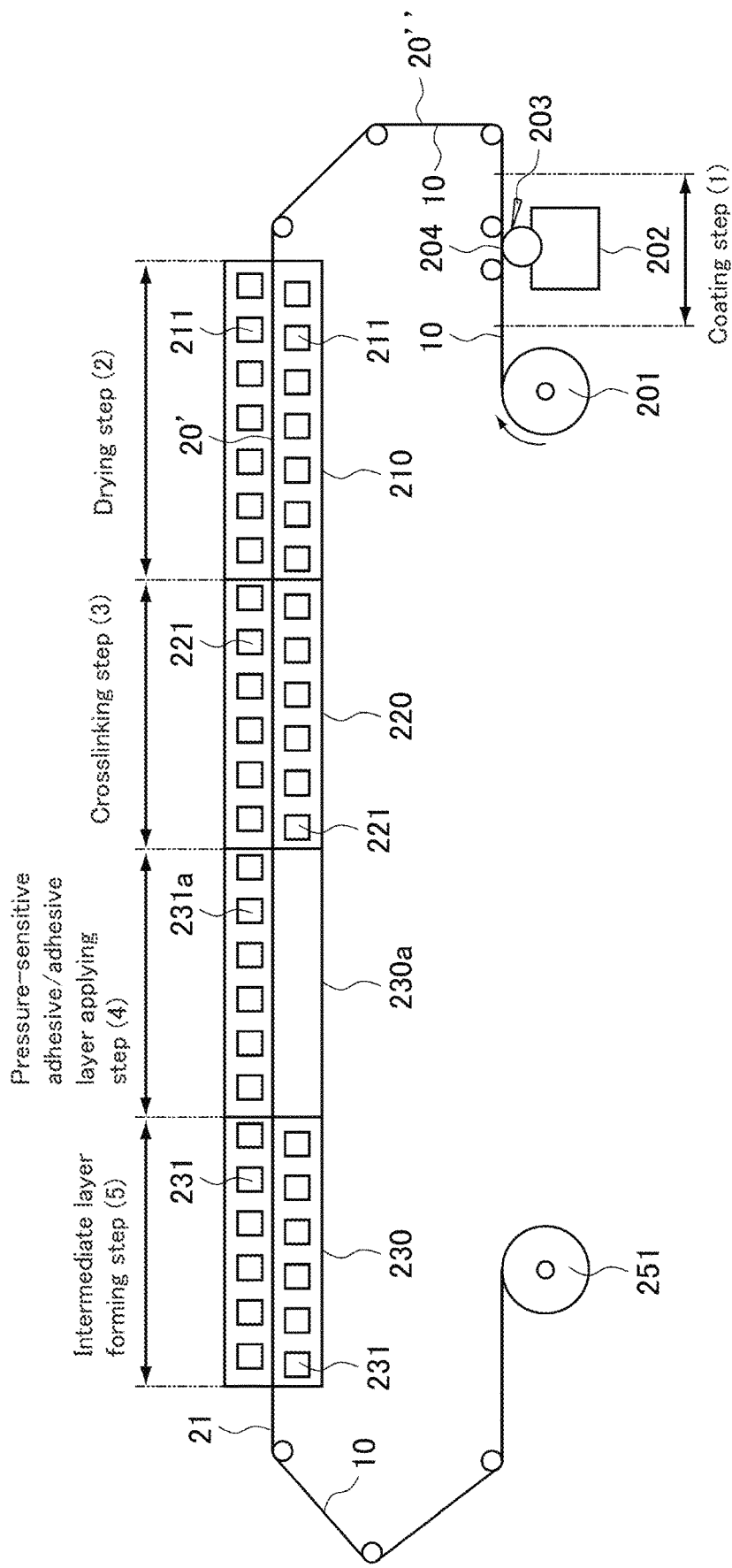
FIG. 9 is an illustration schematically showing still another example of a part of the process of producing an ultra-low refractive index layer of the present invention and still another example of the apparatus used therefor.

FIGS. 7 to 9 show another example of a continuous treatment process of forming an ultra-low refractive index layer of the present invention. As shown in the cross sectional view of FIG. 7, this method includes, after the (3) chemical treatment step (for example, crosslinking treatment step) of forming an ultra-low refractive index layer 20, (4) pressure-sensitive adhesive/adhesive layer applying step (pressure-sensitive adhesive/adhesive layer forming step) of coating the ultra-low refractive index layer 20 with pressure-sensitive adhesive/adhesive layer 30 and (5) intermediate layer forming step of causing the ultra-low refractive index layer 20 to react with the pressure-sensitive adhesive/adhesive layer 30 to form an intermediate layer 22. Except for these, the method shown in FIGS. 7 to 9 is the same as the method shown in FIGS. 4 to 6. In, FIG. 7, the (5) intermediate layer forming step also serves as a step of increasing the strength of the ultra-low refractive index layer 20 (strength increasing step) so that the ultra-low refractive index layer 20 changes to an ultra-low refractive index layer 21 having a higher strength after the (5) intermediate layer forming step. The present invention, however, is not limited thereto, and the ultra-low refractive index layer 20 may not change after the (5) intermediate layer forming step, for example. The (4) pressure-sensitive adhesive/adhesive layer applying step (pressure-sensitive adhesive/adhesive layer forming step) and the (5) intermediate layer forming step are not particularly limited, and can be, for example, as described above.

FIG. 8 is a schematic view showing another example of a slot die coating apparatus and another example of the method of forming an ultra-low refractive index layer using the same. As can be seen, the coating apparatus shown in FIG. 8 is the same as the apparatus shown in FIG. 5 except that the apparatus shown in FIG. 8 includes a pressure-sensitive adhesive/adhesive layer applying zone 130*a* where the (4) pressure-sensitive adhesive/adhesive layer applying step is carried out right next to the chemical treatment zone 120 where the (3) chemical treatment step is carried out. In FIG. 8, the same heat treatment as that carried out in the strength increasing zone (aging zone) 130 of FIG. 5 can be carried out in an intermediate layer forming zone (aging zone) 130 disposed right next to the pressure-sensitive adhesive/adhesive layer applying zone 130*a* using hot air fans (heating units) 131 disposed above and below the base 10. That is, the apparatus shown in FIG. 8 carries out, after the (3) chemical treatment step, the (4) pressure-sensitive adhesive/adhesive layer applying step (pressure-sensitive adhesive/adhesive layer forming step) of applying a pressure-sensitive adhesive or an adhesive to the ultra-low refractive index layer 20 to form a pressure-sensitive adhesive/adhesive layer 30 in the pressure-sensitive adhesive/adhesive layer applying zone 130*a* using pressure-sensitive adhesive/adhesive layer applying units 131*a*. Instead of applying the pressure-sensitive adhesive or the adhesive, for example, an adhesive tape including the pressure-sensitive adhesive/adhesive layer 30 may be adhered (taped) as described above. Thereafter, the (5) intermediate layer forming step (aging step) is carried out in the intermediate layer forming zone (aging zone) 130 to cause the ultra-low refractive index layer 20 to react with the pressure-sensitive adhesive/adhesive layer 30, thereby forming an intermediate layer 22. In this step, the ultra-low refractive index layer 20 changes to an ultra-low refractive index layer 21 having a higher strength as described above. The conditions of the hot air fans (heating units) 131 including the heating temperature, the time, and the like are not limited to particular values, and can be, for example, as described above.

FIG. 9 is a schematic view showing another example of a micro-gravure coating apparatus and another example of the method of forming a porous structure using the same. As can be seen, the coating apparatus shown in FIG. 9 is the same as the apparatus shown in FIG. 6 except that the apparatus shown in FIG. 9 includes a pressure-sensitive adhesive/adhesive layer applying zone 230a where the (4) pressure-sensitive adhesive/adhesive layer applying step is carried out right next to the chemical treatment zone 220 where the (3) chemical treatment step is carried out. In FIG. 9, the same heat treatment as that carried out in the strength increasing zone (aging zone) 230 of FIG. 6 can be carried out in an intermediate layer forming zone (aging zone) 230 disposed right next to the pressure-sensitive adhesive/adhesive layer applying zone 230a using hot air fans (heating units) 231 disposed above and below the base 10. That is, the apparatus shown in FIG. 9 carries out, after the (3) chemical treatment step, the (4) pressure-sensitive adhesive/adhesive layer applying step (pressure-sensitive adhesive/adhesive layer forming step) of applying a pressure-sensitive adhesive or an adhesive to the ultra-low refractive index layer 20 to form a pressure-sensitive adhesive/adhesive layer 30 in the pressure-sensitive adhesive/adhesive layer applying zone 230a using pressure-sensitive adhesive/adhesive layer applying units 231a. Instead of applying the pressure-sensitive adhesive or the adhesive, for example, an adhesive tape including the pressure-sensitive adhesive/adhesive layer 30 may be adhered (taped) as described above. Thereafter, the (5) intermediate layer forming step (aging step) is carried out in the intermediate layer forming zone (aging zone) 230 to cause the ultra-low refractive index layer 20 to react with the pressure-sensitive adhesive/adhesive layer 30, thereby forming an intermediate layer 22. In this step, the ultra-low refractive index layer 20 changes to an ultra-low refractive index layer 21 having a higher strength as described above. The conditions of the hot air fans (heating units) 231 including the heating temperature, the time, and the like are not limited to particular values, and can be, for example, as described above.

[3. Optical Element]

The optical element of the present invention is characterized in that it includes the ultra-low refractive index layer of the present invention as described above. The optical element of the present invention is characterized in that it includes the ultra-low refractive index layer of the present invention, and other configurations are by no means limited. The optical element of the present invention may further include another layer besides the ultra-low refractive index layer of the present invention, for example.

Furthermore, the optical element of the present invention is characterized in that it includes the ultra-low refractive index layer of the present invention as a low reflective layer. The optical element of the present invention is characterized in that it includes the low reflective layer of the present invention, and other configurations are by no means limited. The optical element of the present invention may further include another layer besides the ultra-low refractive index layer of the present invention, for example. The optical element of the present invention is, for example, in the form of a roll.

EXAMPLES

The examples of the present invention are described below. The present invention, however, is not limited by the following examples.

Example 1

In the present example, an ultra-low refractive index layer of the present invention was produced as described below.

(1) Gelation of Silicon Compound 0.95 g of MTMS which is the precursor of a silicon compound was dissolved in 2.2 g of DMSO. 0.5 g of 0.01 mol/L oxalic acid aqueous solution was added to the mixture, and the resultant was stirred at room temperature for 30 minutes to hydrolyze MTMS, thereby preparing tris(hydroxy)methylsilane.

0.38 g of ammonia water having a concentration of 28% and 0.2 g of pure water were added to 5.5 g of DMSO, then the aforementioned mixture that had been subjected to the hydrolysis treatment was added thereto, and the resultant was stirred at room temperature for 15 minutes to gelate tris(hydroxy)methylsilane, thereby obtaining a gelled silicon compound.

(2) Aging Treatment

The aging treatment was carried out as follows. The mixture that had been subjected to the gelation treatment was incubated at 40° C. for 20 hours.

(3) Pulverizing Treatment

Subsequently, the gelled silicon compound that had been subjected to the aging treatment was granulated into pieces of several millimeters to several centimeters using a spatula. 40 g of IPA was added thereto, the mixture was stirred lightly and then was allowed to stand still at room temperature for 6 hours, and a solvent and a catalyst in the gel were decanted. This decantation treatment was repeated three times, and the solvent replacement was completed. Then, the gelled silicon compound in the mixture was subjected to pulverizing treatment (high pressure medialess pulverization). This pulverizing treatment (high pressure medialess pulverization) was carried out using a homogenizer (product of SMT Corporation, product name: UH-50) as follows. That is, 1.18 g of gel and 1.14 g of IPA were added to 5 cc screw bottle and pulverized for 2 minutes at 50 W and 20 kHz.

The gelled silicon compound in the mixture was pulverized by the pulverizing treatment, whereby the mixture was changed to a sol particle liquid of the pulverized product. The volume average particle size showing particle size variations of the pulverized products contained in the mixture measured by a dynamic light scattering nanotrac particle size analyzer (product of NIKKISO CO., LTD., product name: UPA-EX150) was 0.50 to 0.70. 0.02 g of 0.3 wt % KOH aqueous solution was added to 0.5 g of the sol liquid, thereby preparing a coating liquid.

(4) Formation of Coating Film and Silicone Porous Body Roll

The coating liquid was applied to the surface of a resin film (length: 100 m) made of polyethylene terephthalate (PET) by bar coating, thereby forming a coating film. 6 μL of the sol liquid was applied to per square millimeter of the surface of the base. The coating film was treated at 100° C. for one minute, and the formation of the precursor of the silicone porous body and the crosslinking reaction among the pulverized products in the precursor were completed, thereby obtaining a roll in the winding step. Thereby, a silicone porous body roll having a thickness of 1 μm in which the pulverized products are chemically bonded was formed on the base.

(5) Measurement of Property of Ultra-Low Refractive Index Layer

As to the porous body formed on the base, the refractive index, the haze, the strength (abrasion resistance measured with BEMCOT®), and the pore size were measured according to the aforementioned method.

Example 2

A silicone porous body was formed in the same manner as in Example 1 except that the amount of ammonia water, which is a catalyst, was reduced to 0.09 g in gelation of silicon compound precursor MTMS, which is a raw material and the conditions for the incubation in the aging step were changed from at 40° C. for 20 hours to at room temperature for 2 hours. Then, the properties of the silicone porous body were measured.

Comparative Example 1

A porous body was formed in the same manner as in Comparative Example 1 except that KOH was not added to the coating liquid. Then, the properties of the silicone porous body were measured.

The results are summarized in the following Table 1.

TABLE 1

| Item | Example 1 | Example 2 | Comparative Example 1 |
|---|---|---|---|
| Refractive index | 1.10 | 1.24 | 1.31 |
| Haze | 0.3 | 0.4 | 0.4 |
| Abrasion resistance | 65% | 89% | 9% |
| Roll appearance | No scratch | No scratch | Many scratches |
| Pore size | 6 nm | | |

As summarized in Table 1, the ultra-low refractive index layer having a thickness of 1 μm obtained in Example 1 has a refractive index of not more than 1.3, which is equivalent to the refractive index of an air layer and is different from the refractive index of the ultra-low refractive index layer obtained in Comparative Example 1. The bonding treatment reduced scratches from being caused in winding of the roll, which allowed a long film with favorable roll appearance to be obtained. These results also show that each of the ultra-low refractive index layers obtained in Examples 1 and 2, despite its porous structure with void space, has a sufficient strength and sufficient transparency.

Example 3

In the present example, an ultra-low refractive index layer of the present invention was produced as described below.

The "(1) gelation of silicon compound" and the "(2) aging treatment" were carried out in the same manner as in Example 1. Subsequently, the "(3) pulverizing treatment" was carried out in the same manner as in Example 1 except that an isopropyl alcohol (IPA) solution containing 1.5 wt % photobase generation catalyst (product of Wako Pure Chemical Industries, Ltd., product name: WPBG 266) instead of 0.3 wt % KOH aqueous solution was added to the sol particle liquid, thereby preparing a coating liquid. The amount of the IPA solution containing the photobase generation catalyst to be added relative to 0.75 g of the sol particle liquid was 0.031 g. Then, the "(4) formation of coating film and formation of silicone porous body roll" were carried out in the same manner as in Example 1. The porous body obtained in this manner after drying was irradiated with UV. The condition for the UV irradiation was as follows. That is, the wavelength of the light was 360 nm and the amount of the light irradiation (energy) was 500 mJ. After UV irradiation, thermal aging at 60° C. was carried out for 22 hours, thereby forming an ultra-low refractive index layer (silicone porous body roll) of the present example.

Example 4

An ultra-low refractive index layer of the present example was produced in the same manner as in Example 2 except that thermal aging was not performed after UV irradiation.

Example 5

An ultra-low refractive index layer of the present example was produced in the same manner as in Example 2 except that, after the IPA solution containing the photobase generation catalyst had been added, 0.018 g of 5 wt % bis (trimethoxy)silane was added to 0.75 g of the sol liquid to adjust a coating liquid.

Example 6

An ultra-low refractive index layer of the present example was produced in the same manner as in Example 2 except that the amount of the IPA solution containing the photobase generation catalyst to be added relative to 0.75 g of sol liquid was 0.054 g.

Example 7

After subjecting the porous body after drying to the UV irradiation in the same manner as in Example 2 and before subjecting the porous body to the thermal aging, the pressure-sensitive adhesive side of a PET film, to one side of which a pressure-sensitive adhesive (pressure-sensitive adhesive/adhesive layer) is applied, was adhered to the porous body at room temperature, and then the porous body was subjected to thermal aging at 60° C. for 22 hours. Except for this, an ultra-low refractive index layer of the present example was produced in the same manner as in Example 2.

Example 8

An ultra-low refractive index layer of the present example was produced in the same manner as in Example 6 except that thermal aging was not carried out after adhering the PET film.

Example 9

An ultra-low refractive index layer of the present example was produced in the same manner as in Example 6 except that, after the IPA solution containing the photobase generation catalyst had been added, 0.018 g of 5 wt % bis (trimethoxy)silane was added to 0.75 g of the sol liquid to adjust a coating liquid.

Example 10

An ultra-low refractive index layer of the present example was produced in the same manner as in Example 6 except that the amount of the IPA solution containing the photobase generation catalyst to be added relative to 0.75 g of the sol liquid was 0.054 g.

The refractive index, the peel strength, and the haze of each of the ultra-low refractive index layers obtained in Examples 3 to 10 were measured according to the above-described method. The results are summarized in Tables 2 and 3. In measurement of the peel strength of each of the ultra-low refractive index layers obtained in Examples 7 to 10, since a PET film and a pressure-sensitive adhesive had already adhered to the laminated film roll, adhering the PET film and acrylic pressure-sensitive adhesive to the laminated film roll was omitted.

TABLE 2

|  | Example 3 | Example 4 | Example 5 | Example 6 |
|---|---|---|---|---|
| Refractive index | 1.14 | 1.15 | 1.15 | 1.16 |
| Peel strength | 2N/25 mm | 1.2N/25 mm | 3N/25 mm | 2N/25 mm |
| Haze | 0.4 | 0.4 | 0.4 | 0.4 |
| Abrasion resistance | 70% | 70% | 75% | 78% |
| Roll appearance | No scratch | No scratch | No scratch | No scratch |

TABLE 3

|  | Example 7 | Example 8 | Example 9 | Example 10 |
|---|---|---|---|---|
| Refractive index | 1.14 | 1.15 | 1.15 | 1.16 |
| Peel strength | 2N/25 mm | 1.2N/25 mm | 3N/25 mm | 2N/25 mm |
| Haze | 0.4 | 0.4 | 0.4 | 0.4 |
| Abrasion resistance | 70% | 75% | 75% | 78% |
| Roll appearance | No scratch | No scratch | No scratch | No scratch |

As summarized in Tables 2 and 3, each of the ultra-low refractive index layers having a thickness of 1 μm obtained in Examples 3 to 10 has a very low refractive index in the range from 1.14 to 1.16. Furthermore, these ultra-low refractive index layers each show a very low haze value of 0.4, which shows very high transparency. Furthermore, since each of the ultra-low refractive index layers obtained in Examples 3 to 10 has a high peel strength, even after forming a roll by winding the ultra-low refractive index layer, the layer is less likely to be peeled from another layer of the laminated film roll. Moreover, each of the ultra-low refractive index layers obtained in Examples 3 to 10 is superior in an abrasion resistance and is hardly scratched. Each of the coating liquids of Examples 3 to 10 was visually observed after one week storage, and no change was observed. This shows that the coating liquid is superior in the storage stability and that a laminated film roll of stable quality can be produced efficiently.

INDUSTRIAL APPLICABILITY

As described above, the ultra-low refractive index layer of the present invention showing the above-described properties easily achieves a low refractive index, which allows the ultra-low refractive index layer to be a substitute for an air layer, for example. Thus, there is no need to provide air layers by disposing components at regular spacings for achieving a low refractive index. By disposing the ultra-low refractive index layer of the present invention at a desired site, a low refraction index can be achieved. Thus, the ultra-low refractive index layer of the present invention is useful to an optical element which requires a low refractive index, for example.

EXPLANATION OF REFERENCE NUMERALS 10 base
20 ultra-low refractive index layer
20' coating film (precursor layer)
20" sol particle liquid
21 ultra-low refractive index layer with improved strength
101 delivery roller
102 coating roller
110 oven zone
111 hot air fan (heating unit)
120 chemical treatment zone
121 lamp (light irradiation unit) or hot air fan (heating unit)
130a pressure-sensitive adhesive/adhesive layer applying zone
130 intermediate forming zone
131a pressure-sensitive adhesive/adhesive layer applying unit
131 hot air fan (heating unit)
105 winding roller
106 roller
201 delivery roller
202 liquid reservoir
203 doctor (doctor knife)'
204 micro-gravure
210 oven zone
211 heating unit
220 chemical treatment zone
221 lamp (light irradiation unit) or hot air fan (heating unit)
230a pressure-sensitive adhesive/adhesive layer applying zone
230 intermediate forming zone
231a pressure-sensitive adhesive/adhesive layer applying unit
231 hot air fan (heating unit)
251 winding roller

The invention claimed is:
1. A laminated film roll comprising:
an ultra-low refractive index layer forms a monolithic structure having minute void spaces, and an open cell structure with multiple pore distributions in which the minute void spaces are aggregated and three-dimensionally interconnected; and
a resin film,
wherein the ultra-low refractive index layer is stacked on the resin film,
the ultra-low refractive index layer consists of structural units in the shape of particles which are chemically and directly bonded by a catalyst, and the minute void spaces formed between the structural units in the shape of particles, the structural units in the shape of particles are microporous inorganic particles of a pulverized product of a gelled silicon compound, wherein a volume average particle size of the microporous inorganic particles is more than 0.10 μm, and wherein the ultra- low refractive index layer has a proportion of void space of 40% or more, and a refractive index of 1.2 or less.

2. The laminated film roll according to claim 1, wherein the bond among the structural units includes a hydrogen bond or a covalent bond.

3. The laminated film roll according to claim 1, wherein the microporous inorganic particle further includes at least one element selected from the group consisting of Mg, Al, Ti, Zn, and Zr.

4. The laminated film roll according to claim 1, wherein the minute void spaces have a pore size is in a range from 2 to 200 nm.

5. The laminated film roll according to claim 1, wherein the ultra-low refractive index layer has a thickness in a range from 0.01 to 100 µm.

6. The laminated film roll according to claim 1, wherein the ultra-low refractive index layer has a haze value of less than 5%.

7. The laminated film roll according to claim 1, wherein the volume average particle size of the microporous inorganic particles is 0.20 µm or more.

8. An optical element comprising:
an ultra-low refractive index layer forming a monolithic structure having minute void spaces, and an open cell structure with multiple pore distributions in which the minute void spaces are aggregated and three-dimensionally interconnected; and
a resin film,
wherein the ultra-low refractive index layer is stacked on the resin film,
the ultra-low refractive index layer consists of structural units in the shape of particles which are chemically and directly bonded by a catalyst, and minute void spaces formed between the structural units in the shape of particles, the structural units in the shape of particles are microporous inorganic particles of a pulverized product of a gelled silicon compound, wherein a volume average particle size of the microporous inorganic particles is more than 0.10 µm, wherein the ultra-low refractive index layer has a proportion of void space of 40% or more, and a reflective index of 1.2 or less, and
wherein the optical element is in the form of a film roll.

* * * * *